(12) United States Patent
Dorwin et al.

(10) Patent No.: US 9,697,366 B1
(45) Date of Patent: *Jul. 4, 2017

(54) USE OF GENERIC (BROWSER) ENCRYPTION API TO DO KEY EXCHANGE (FOR MEDIA FILES AND PLAYER)

(71) Applicant: Google Inc., Mountain View, CA (US)

(72) Inventors: David Kimbal Dorwin, Kirkland, WA (US); Ryan David Sleevi, Sunnyvale, CA (US); Andrew Martin Scherkus, Seattle, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/640,611

(22) Filed: Mar. 6, 2015

Related U.S. Application Data

(63) Continuation of application No. 13/712,764, filed on Dec. 12, 2012, now Pat. No. 8,984,285.

(60) Provisional application No. 61/569,755, filed on Dec. 12, 2011.

(51) Int. Cl.
*H04L 29/06* (2006.01)
*G06F 21/60* (2013.01)

(52) U.S. Cl.
CPC .................................. *G06F 21/602* (2013.01)

(58) Field of Classification Search
None
See application file for complete search history.

(56) References Cited

U.S. PATENT DOCUMENTS

| | | | |
|---|---|---|---|
| 5,067,035 A | 11/1991 | Kudelski et al. | |
| 5,134,656 A | 7/1992 | Kudelski | |
| 5,144,663 A | 9/1992 | Kudelski et al. | |
| 5,191,611 A | 3/1993 | Lang | |
| 5,339,413 A | 8/1994 | Koval et al. | |
| 5,375,168 A | 12/1994 | Kudelski | |
| 5,590,200 A | 12/1996 | Nachman et al. | |
| 5,689,565 A * | 11/1997 | Spies | G06F 21/602 380/277 |
| 5,799,089 A | 8/1998 | Kuhn et al. | |
| 5,870,474 A | 2/1999 | Wasilewski et al. | |

(Continued)

OTHER PUBLICATIONS

Didner et al., "Intelligent Systems for Finance and Business," University College London, Dec. 1995, pp. 31-173.

*Primary Examiner* — Jeffery Williams
(74) *Attorney, Agent, or Firm* — Bryne Poh LLP

(57) ABSTRACT

Embodiments are directed towards decrypting encrypted content. A key for decrypting the encrypted content may be provided to a web application executing within a browser. The application may employ a generic cryptography application program interface (GCAPI) to perform actions on the key, including, storing the key, decrypting an encrypted key, generating another key, converting the key to a different encryption type, or the like. The GCAPI may or may not be enabled to explicitly share the key with the browser's media engine. In response to receiving encrypted content, the GCAPI may provide the key to the application, explicitly or inexplicitly to the browser's media engine, or the like. The key may be utilized by the application, the browser, the media element, browser's media engine, and/or the GCAPI to decrypt the encrypted content. The decrypted content may be displayed within the browser to a user of a client device.

16 Claims, 14 Drawing Sheets

(56) References Cited

U.S. PATENT DOCUMENTS

| | | |
|---|---|---|
| 5,883,957 A | 3/1999 | Moline et al. |
| 5,933,498 A | 8/1999 | Schneck et al. |
| 5,939,975 A | 8/1999 | Tsuria et al. |
| 5,943,422 A | 8/1999 | Van Wie et al. |
| 6,021,197 A | 2/2000 | von Willich et al. |
| 6,038,433 A | 3/2000 | Vegt |
| 6,049,671 A | 4/2000 | Slivka et al. |
| 6,073,256 A | 6/2000 | Sesma |
| 6,112,181 A | 8/2000 | Shear et al. |
| 6,141,753 A | 10/2000 | Zhao et al. |
| 6,157,721 A | 12/2000 | Shear et al. |
| 6,178,242 B1 | 1/2001 | Tsuria |
| 6,189,097 B1 | 2/2001 | Tycksen et al. |
| 6,191,782 B1 | 2/2001 | Mori et al. |
| 6,240,185 B1 | 5/2001 | Van Wie et al. |
| 6,256,668 B1 | 7/2001 | Slivka et al. |
| 6,272,636 B1 | 8/2001 | Neville et al. |
| 6,292,569 B1 | 9/2001 | Shear et al. |
| 6,311,221 B1 | 10/2001 | Raz et al. |
| 6,314,409 B2 | 11/2001 | Schneck et al. |
| 6,314,572 B1 | 11/2001 | LaRocca et al. |
| 6,334,213 B1 | 12/2001 | Li |
| 6,385,596 B1 | 5/2002 | Wiser et al. |
| 6,405,369 B1 | 6/2002 | Tsuria |
| 6,449,367 B2 | 9/2002 | Van Wie et al. |
| 6,459,427 B1 | 10/2002 | Mao et al. |
| 6,466,670 B1 | 10/2002 | Tsuria et al. |
| 6,505,299 B1 | 1/2003 | Zeng et al. |
| RE38,070 E * | 4/2003 | Spies ............... G06F 21/602 380/277 |
| 6,587,561 B1 | 7/2003 | Sered et al. |
| 6,618,484 B1 | 9/2003 | Weber et al. |
| 6,651,170 B1 | 11/2003 | Rix |
| 6,654,420 B1 | 11/2003 | Snook |
| 7,007,170 B2 | 2/2006 | Morten |
| 7,165,175 B1 | 1/2007 | Kollmyer et al. |
| 7,356,143 B2 | 4/2008 | Morten |
| 7,640,435 B2 | 12/2009 | Morten |
| 7,805,616 B1 | 9/2010 | Mohammed et al. |
| 7,817,608 B2 | 10/2010 | Rassool et al. |
| 7,953,882 B2 | 5/2011 | Shukla et al. |
| 8,984,285 B1 * | 3/2015 | Dorwin ............... G06F 21/6209 713/151 |
| 2002/0021805 A1 | 2/2002 | Schumann et al. |
| 2002/0049679 A1 | 4/2002 | Russell et al. |
| 2003/0046568 A1 | 3/2003 | Riddick et al. |
| 2004/0031856 A1 * | 2/2004 | Atsmon ............... G06F 21/34 235/492 |
| 2004/0117500 A1 | 6/2004 | Lindholm et al. |
| 2004/0184616 A1 | 9/2004 | Morten |
| 2005/0066353 A1 * | 3/2005 | Fransdonk ............ H04L 63/083 725/29 |
| 2005/0125358 A1 * | 6/2005 | Levin ............... G06F 21/10 705/59 |
| 2006/0020811 A1 * | 1/2006 | Tan ............... H04L 63/067 713/180 |
| 2006/0212363 A1 * | 9/2006 | Peinado ............... G06F 21/10 705/26.1 |
| 2007/0160208 A1 * | 7/2007 | MacLean ............ H04N 7/1675 380/210 |
| 2007/0209005 A1 | 9/2007 | Shaver et al. |
| 2007/0219917 A1 | 9/2007 | Liu et al. |
| 2007/0294170 A1 * | 12/2007 | Vantalon ............... G06F 21/10 705/50 |
| 2008/0027871 A1 | 1/2008 | Seo |
| 2008/0147671 A1 | 6/2008 | Simon et al. |
| 2008/0313264 A1 | 12/2008 | Pestoni |
| 2009/0007198 A1 | 1/2009 | Lavender et al. |
| 2009/0031408 A1 | 1/2009 | Thom et al. |
| 2009/0044008 A1 | 2/2009 | Lim |
| 2009/0183001 A1 * | 7/2009 | Lu ............... G06F 21/10 713/168 |
| 2009/0249426 A1 * | 10/2009 | Aoki ............... H04N 7/17318 725/131 |
| 2010/0023760 A1 | 1/2010 | Lee et al. |
| 2010/0256976 A1 * | 10/2010 | Atsmon ............... G06F 21/34 704/231 |
| 2010/0299701 A1 * | 11/2010 | Liu ............... G06F 17/30053 725/39 |
| 2011/0179283 A1 | 7/2011 | Thom et al. |
| 2011/0225417 A1 * | 9/2011 | Maharajh ............ G06F 21/10 713/150 |
| 2012/0066494 A1 | 3/2012 | Lee et al. |
| 2012/0117183 A1 | 5/2012 | Wong et al. |
| 2012/0151515 A1 * | 6/2012 | Atsmon ............... G06F 21/34 725/23 |
| 2012/0173884 A1 | 7/2012 | Patil |
| 2012/0331293 A1 * | 12/2012 | Ma ............... H04L 9/0891 713/168 |
| 2013/0072126 A1 | 3/2013 | Topaltzas et al. |

* cited by examiner

USE OF GENERIC (BROWSER) ENCRYPTION API TO DO KEY EXCHANGE (FOR MEDIA FILES AND PLAYER)

CROSS REFERENCE TO RELATED APPLICATIONS

This application is a continuation of U.S. patent application Ser. No. 13/712,764, filed Dec. 12, 2012, which claims the benefit of United States Provisional Patent Application No. 61/569,755, filed Dec. 12, 2011, each of which are hereby incorporated by reference herein in their entireties.

TECHNICAL FIELD

The present invention relates generally to content management, and more particularly, but not exclusively, to employing a generic cryptography application program interface within a browser to enable key exchange for decrypting encrypted content.

BACKGROUND

Today, HTML5 media tags, such as <video> and <audio> tags, are available to provide content providers with a simple way to deliver audio and video content onto the web, and have it play on virtually any web browser or browser-based device. The underlying functionality of the HTML media tags are often referred to as HTML media elements. However, HTML5 does not currently support decryption of encrypted content. Similarly, there are no standardized interfaces to implement cryptography operations and/or elaborate key exchanges. Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1:
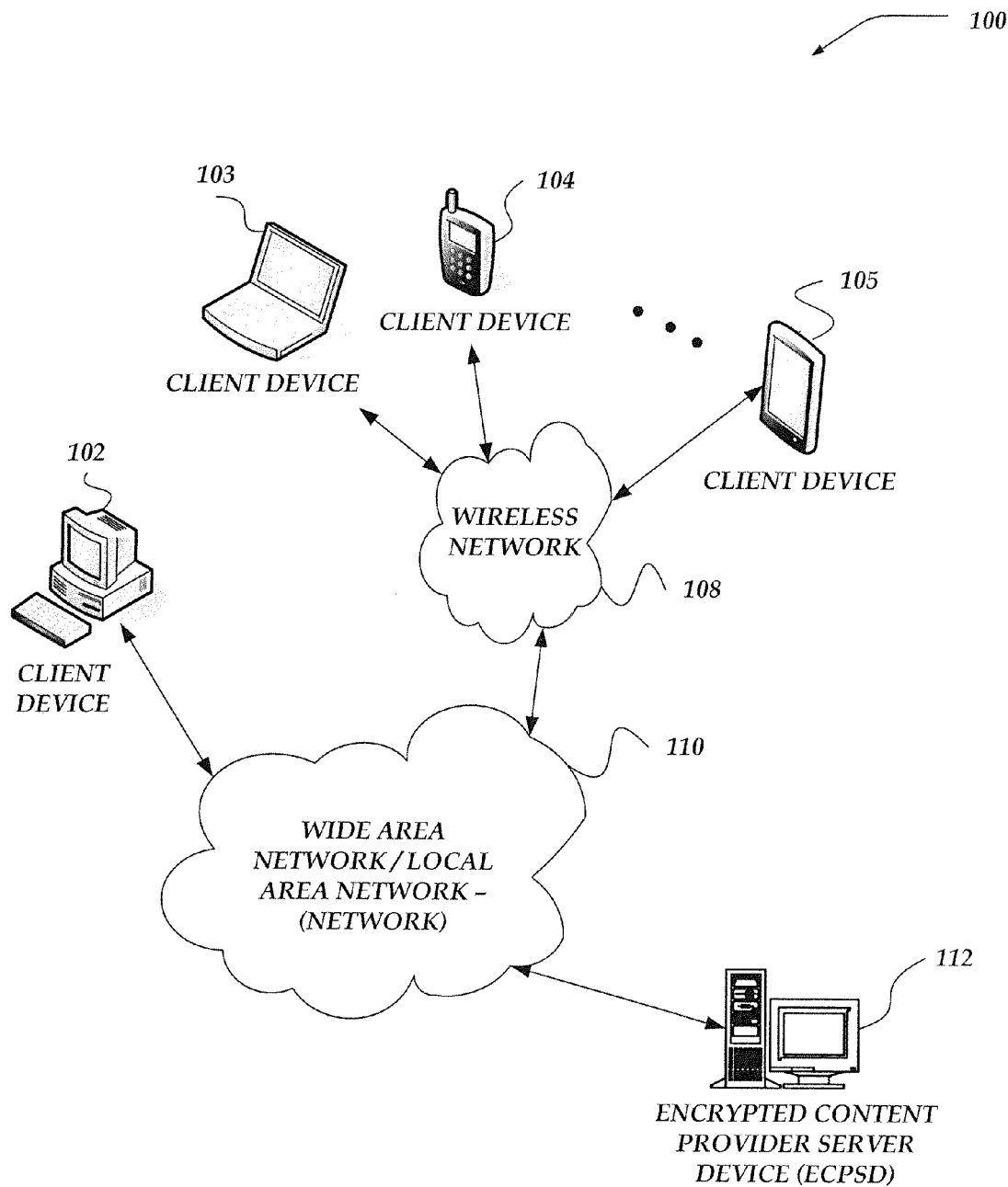
FIG. 1 is a system diagram of an environment in which embodiments of the invention may be implemented.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "application" may refer to a web application that may be employed by and/or operate within a browser application (also referred to herein as a browser). Applications may include software written in a browser-supported language, such as, for example, HTML or JavaScript. In at least one embodiment, application may include web applications that may be accessed over a network. Embodiments described herein that reference a browser and/or browser application may also include and/or apply to other types of user agents.

As used herein, the term "content" may refer to digital data that may be displayed within and/or otherwise provided to a user through a browser application. In at least one embodiment, content may be communicated over a network to be remotely displayed by a computing device. Non-exhaustive examples of content include but are not limited to movies, videos, music, sounds, pictures, illustrations, graphics, images, text, or the like. Encrypted content may refer to content that is encrypted using at least one of a variety of encryption algorithms and/or methods known to those in the art.

As used herein, the term "media element" or "media tag" may refer to an individual component of a markup language for displaying web pages in a web browser application. Media elements/tags may include for example, <media>, <video>, <audio>, and the like. However, the various embodiments are not so limited, since virtually any other media elements/tags also may be utilized, including, but not limited to, <img>, <canvas>, Web Audio API, and the like, and any other media elements/tags that may be developed in the future. In at least some embodiments, media elements/tags may be modified to include support for decrypting encrypted content, such as through an encrypted media extension application program interfaces (API). As used herein, the phrase "encrypted media extension API" may refer to an interface implemented by and/or employed by the browser application that expands the functionality of known media elements/tags to perform and/or enable at least one of decryption of encrypted content and encryption of content.

As used herein, the phrase "generic cryptography API" (GCAPI) may refer to a browser interface can enable and/or perform cryptographic operations on data. In some embodiments, the GCAPI may be configured to decrypt encrypted content, decrypt encrypted keys, generate other keys, convert keys from one encryption type to another encryption type; extract keys from licenses, or the like. The GCAPI may enable decryption and/or extend browser cryptographic operations of encrypted content for rendering content utilizing media elements. One example of a GCAPI may be the Web Cryptography API.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to decrypting encrypted content on a client device. In some embodiments, the client device may request encrypted content, such as from a content server. The request may be from an action of an application, a website, a browser, or the like. In at least one such embodiment, a key for decrypting the encrypted content may be provided to the client device in response to the request. In other embodiments, the client device may explicitly request the key for decrypting encrypted content. In at least one of various embodiments, the key may be provided to an application executing within a browser on the client device.

In some embodiments, the application may employ a generic cryptography application program interface (GCAPI) implemented/employed by the browser to store and/or use the key. In some embodiments, the GCAPI may perform an action on the key, such as decrypt an encrypted key, generate another key based on the provided key (i.e., from one encryption type to another encryption type), extract the key from a license, perform device verification, perform other digital rights management (DRM) functionality, or the like. The GCAPI may then store the key such that the key may be accessible to the GCAPI, an encryption/decryption API (e.g., encrypted media extension API), the browser, or the like. In some embodiments, the GCAPI may be enabled to explicitly share a key with the encrypted media extension API; while in other embodiments, the GCAPI may not be enabled to explicitly share a key with the encrypted media extension API.

Encrypted content may be provided to the client device, such as from a content server. In at least one embodiment, the encrypted content may be provided to the client device after the corresponding key is stored by the GCAPI. However, embodiments are not so limited. For example, in other embodiments, the key may be requested after the encrypted content is provided to the client device. In some embodiments, providing encrypted content to a client device may include, providing the encrypted content to the application, the browser based on a media element, a media engine (e.g., a media stack) of the browser, or the like.

In response to receiving encrypted content, the key stored by the GCAPI may be provided to the application and/or the browser using the media element. In at least one embodiment, the GCAPI may provide the key to the application, which may, in some embodiments, provide the key to the browser using the media element (i.e., the GCAPI may inexplicitly provide the key to the browser). In another embodiment, the GCAPI may be utilized by the browser to enable the key to be explicitly provided to the browser using the media element in response to a request for a key from the browser. In some embodiments, using the media element, the browser may request a specific key, request a key maintained by the GCAPI for use for any media element, request a key maintained by the GCAPI for use for a particular/specific media element, or the like. In some embodiments, the GCAPI may provide the key itself or a reference to the key, such as a handle to the key.

In some embodiments, using the media element, the browser may be employed to use the key to decrypt the encrypted content, such as through an encrypted media extension API. In other embodiments, a backend enabling the media elements (e.g., a media engine of the browser) may be employed to use the key to decrypt the content. In yet other embodiments, the application may decrypt the encrypted content before the application provides the content to the browser using the media element. In some such embodiments, the GCAPI may be utilized by the application to decrypt the content. In other embodiments, the application itself may decrypt the encrypted content. The decrypted content may be displayed with the browser to a user of the client device.

In some embodiments, the GCAPI, media element, encrypted media extension API, and/or media engine may be implemented and/or employed by the browser. In various embodiments, the GCAPI, media element, encrypted media extension API, and/or media engine may enable and/or be utilized by the browser to perform actions. Some embodiments may be described herein as the GCAPI, media element, encrypted media extension API, and/or media engine performing an action; however, embodiments are not so limited, but rather may include the browser performing the action and/or enabling another component to perform the action through and/or implementing the GCAPI, media element, encrypted media extension API, and/or media engine. In various embodiments described herein, use and/or employment of an API by the browser and/or media element may also refer to use and employment of a backend and/or implementation of the API.

Illustrative Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client devices 102-105, and Encrypted Content Provider Server Device (ECPSD) 112.

Embodiments of client devices 102-105 is described in more detail below in conjunction with FIGS. 2A-2B. Briefly, in some embodiments, client devices 102-105 may be configured to utilize a generic cryptography API to perform key exchange, decryption of encrypted content, and/or extend browser cryptography operations.

In one embodiment, at least some of client devices 102-105 may operate over a wired and/or wireless network, such as networks 110 and/or 108. Generally, client devices 102-105 may include virtually any computing device capable of communicating over a network to send and receive information, perform various online activities, offline actions, or the like. In one embodiment, one or more of client devices 102-105 may be configured to operate within a business or other entity to perform a variety of services for the business or other entity. For example, client devices 102-105 may be configured to operate as a web server, an accounting server, a production server, an inventory server, or the like. However, client devices 102-105 are not constrained to these services and may also be employed, for example, as an end-user computing node, in other embodiments. It should be recognized that more or less client devices may be included within a system such as described herein, and embodiments are therefore not constrained by the number or type of client devices employed.

Devices that may operate as client device 102 may include devices that typically connect using a wired or wireless communications medium such as personal computers, multiprocessor systems, microprocessor-based or programmable electronic devices, network PCs, or the like. In some embodiments, client devices 102-105 may include virtually any portable personal computing device capable of connecting to another computing device and receiving information such as, laptop computer 103, smart mobile telephone 104, and tablet computers 105, and the like. However, portable computing devices are not so limited and may also include other portable devices such as cellular telephones, display pagers, radio frequency (RF) devices, infrared (IR) devices, Personal Digital Assistants (PDAs), handheld computers, wearable computers, integrated devices combining one or more of the preceding devices, and the like. As such, client devices 102-105 typically range widely in terms of capabilities and features. Moreover, client devices 102-105 may access various computing applications, including a browser, or other web-based application.

A web-enabled client device may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), and the like, to display and send a message. In one embodiment, a user of the client device may employ the browser application to perform various activities over a network (online). However, another application may also be used to perform various online activities.

Client devices 102-105 also may include at least one other client application that is configured to receive and/or send content between another computing device. The client application may include a capability to send and/or receive content, or the like. The client application may further provide information that identifies itself, including a type, capability, name, and the like. In one embodiment, client devices 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client devices, ECPSD 112, or other computing devices.

Client devices 102-105 may further be configured to include a client application that enables an end-user to log into an end-user account that may be managed by another computing device, such as ECPSD 112, or the like. Such end-user account, in one non-limiting example, may be configured to enable the end-user to manage one or more online activities, including in one non-limiting example, search activities, social networking activities, browse various websites, communicate with other users, or the like. In other embodiments, an end-user account may be configured to enable the end-user to access encrypted content at ECPSD 112. However, participation in such online activities may also be performed without logging into the end-user account.

Wireless network 108 is configured to couple client devices 103-105 and its components with network 110. Wireless network 108 may include any of a variety of wireless sub-networks that may further overlay stand-alone ad-hoc networks, and the like, to provide an infrastructure-oriented connection for client devices 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile devices, such as client devices 103-105 with various degrees of mobility. In one non-limiting example, wireless network 108 may enable a radio connection through a radio network access such as Global System for Mobile communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client devices 103-105 and another computing device, network, and the like.

Network 110 is configured to couple network devices with other computing devices, including, ECPSD 112, client device 102, and client devices 103-105 through wireless network 108. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP). In essence, network 110 includes any communication method by which information may travel between computing devices.

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of ECPSD 112 is described in more detail below in conjunction with FIG. 3. Briefly, however, ECPSD 112 includes virtually any network device capable of storing, accessing, and/or providing encrypted (and/or unencrypted) content to a client device, such as client devices 102-105. Devices that may be arranged to operate as ECPSD 112 include various network devices, including, but not limited to personal computers, desktop computers, multiprocessor systems, microprocessor-based or programmable consumer electronics, network PCs, server devices, network appliances, and the like.

Although FIG. 1 illustrates ECPSD 112 as a single computing device, the invention is not so limited. For example, one or more functions of the ECPSD 112 may be distributed across one or more distinct network devices. Moreover, ECPSD 112 is not limited to a particular configuration. Thus, in one embodiment, ECPSD 112 may contain a plurality of network devices to provide encrypted content to a client device. In another embodiment, ECPSD 112 may contain a plurality of network devices that operate using a master/slave approach, where one of the plurality of network devices of ECPSD 112 operates to manage and/or otherwise coordinate operations of the other network devices. In other embodiments, the ECPSD 112 may operate as a plurality of network devices within a cluster architecture, a peer-to-peer architecture, and/or even within a cloud architecture. Thus, the invention is not to be construed as being limited to a single environment, and other configurations, and architectures are also envisaged.

Illustrative Client Devices

Figure 2A:
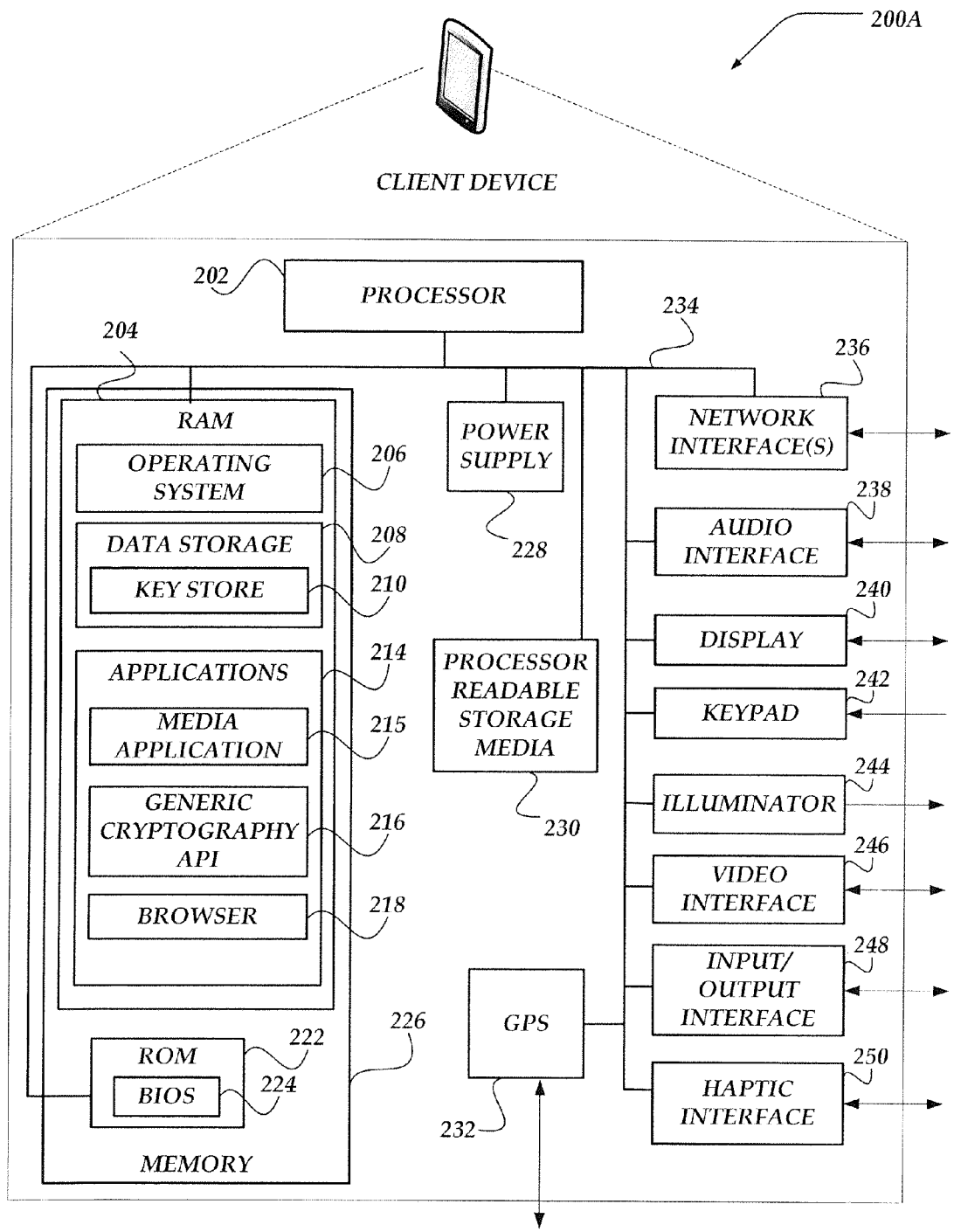
FIGS. 2A-2B show embodiments of a client device that may be included in a system such as that shown in FIG. 1.

FIG. 2A shows one embodiment of client device 200A that may be included in a system implementing embodiments of the invention. Client device 200A may include many more or less components than those shown in FIG. 2A. However, the components shown are sufficient to disclose an illustrative embodiment for practicing the present invention. Client device 200A may represent, for example, one embodiment of at least one of client devices 102-105 of FIG. 1.

As shown in the figure, client device 200A includes a processor 202 in communication with a mass memory 226 via a bus 234. In some embodiments, processor 202 may include one or more central processing units (CPU). Client device 200A also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client device 200A. A rechargeable or non-rechargeable battery may be used to provide power. The power may also be provided by an external power source, such as an alternating current (AC) adapter or a powered docking cradle that supplements and/or recharges a battery.

Client device 200A may optionally communicate with a base station (not shown), or directly with another computing device. Network interface 236 includes circuitry for coupling client device 200A to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computing device. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client device is powered. Also, illuminator 244 may backlight these buttons in various patterns when particular actions are performed, such as dialing another client device. Illuminator 244 may also cause light sources positioned within a transparent or translucent case of the client device to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client device 200A also comprises input/output interface 248 for communicating with external devices, such as a headset, or other input or output devices not shown in FIG. 2A. Input/output interface 248 can utilize one or more communication technologies, such as USB, infrared, Bluetooth™, or the like.

Haptic interface 250 is arranged to provide tactile feedback to a user of the client device. For example, the haptic interface 250 may be employed to vibrate client device 200A in a particular way when another user of a computing device is calling. In some embodiments, haptic interface 250 may be optional.

Client device 200A may also include GPS transceiver 232 to determine the physical coordinates of client device 200A on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client device 200A on the surface of the Earth. It is understood that under different conditions, GPS transceiver 232 can determine a physical location within millimeters for client device 200A; and in other cases, the determined physical location may be less precise, such as within a meter or significantly greater distances. In one embodiment, however, mobile device 200A may through other components, provide other information that may be employed to determine a physical location of the device, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client device 200A. The mass memory also stores an operating system 206 for controlling the operation of client device 200A. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client device 200A to store, among other things, applications 214 and/or other data. For example, data storage 208 may also be employed to store information that describes various capabilities of client device 200A. The information may then be provided to another device based on any of a variety of events, including being sent as part of a header during a communication, sent upon request, or the like. Data storage 208 may also be employed to store social networking information including address books, buddy lists, aliases, user profile information, or the like. Further, data storage 208 may also store message, we page content, or any of a variety of user generated content. At least a portion of the information may also be stored on another component of network device 200A, including, but not limited to processor readable storage media 230, a disk drive or other computer readable storage devices (not shown) within client device 200A.

Data storage 208 may also include key store 210. Key store 210 may be configured to store at least one key that may be utilized by encryption algorithms to decrypt encrypted content. Key store 210 may be accessible to generic cryptography API 216, media application 215, and/or browser 218. However, in some embodiments, key store 210 may be assessable to generic cryptography API 216, but not other applications and/or interfaces. In at least one embodiment, data store 210 may manage keys based on a corresponding key ID (identifier), such as, for example, in a table, or other suitable data structure.

Processor readable storage media 230 may include volatile, nonvolatile, removable, and nonremovable media implemented in any method or technology for storage of information, such as computer- or processor-readable instructions, data structures, program modules, or other data.

Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computing device. Processor readable storage media 230 may also be referred to herein as computer readable storage media and/or computer readable storage device.

Applications 214 may include computer executable instructions which, when executed by client device 200A, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client device. Applications 214 may include, for example, browser 218, and other applications. Other applications may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client device 200A to communicate with another network device, such as ECPSD 112 of FIG. 1.

Applications 214 may also include media application 215 and generic cryptography API (GCAPI) 216. Media application 215 may include web applications executed by browser 218. In some embodiments, media application 215 may be configured to enable key exchanges between a content server, such as ECPSD 112 of FIG. 1, GCAPI 216, and/or browser 218. In some other embodiments, media application 215 may be configured to provide keys and/or references to keys (e.g., a handle to a key) to the browser using the media elements. In at least one embodiment, media application 215 may be configured to receive encrypted and/or unencrypted content and provide it to the browser based on at least one media element. In some embodiments, media application 215 may be configured to provide encrypted content to GCAPI 216 and receive unencrypted content back. In other embodiments, media application 215 may be configured to perform decryption operations on encrypted content.

GCAPI 216 may be configured to support key exchanges and other decryption operations of encrypted content. In some embodiments, GCAPI 216 may be enabled to decrypted blocks of encrypted content provided from media application 215. In other embodiments, GCAPI 216 may be configured to enable key exchanges between a server device, such as ECPSD 112 of FIG. 1 and browser 218. GCAPI may provide keys or references to keys (e.g., a handle to a key) to media application 215 and/or browser 218 using the media elements. In at least one embodiment, GCAPI 216 may be configured to decrypt encrypted key and/or convert key in one encryption type to another encryption type (i.e., generate another key based on the provided key). In other embodiments, GCAPI 216 may be utilized to provide a variety of key and/or license management, including, but not limited to, verifying licenses, providing data rights management (DRM) functionality, signing license requests, attesting, providing key lifetime management, heartbeat, capability detection, or the like.

In some embodiments, there may be explicit support for sharing keys between GCAPI 216 and browser 218, and in other embodiments, there may be no explicit support. GCAPI 216 may, in some embodiments, be plug-in, add-on, or other interface of browser 218. In some embodiments, the media elements may be modified to enable browser 218 to utilize keys and/or key IDs (e.g., handles of a key).

In any event, media application 215, generic cryptography API 216, and browser 218 of FIG. 2A may employ processes, or parts of processes, similar to those described in conjunction with FIGS. 5-8, to perform at least some of its actions.

Figure 2B:
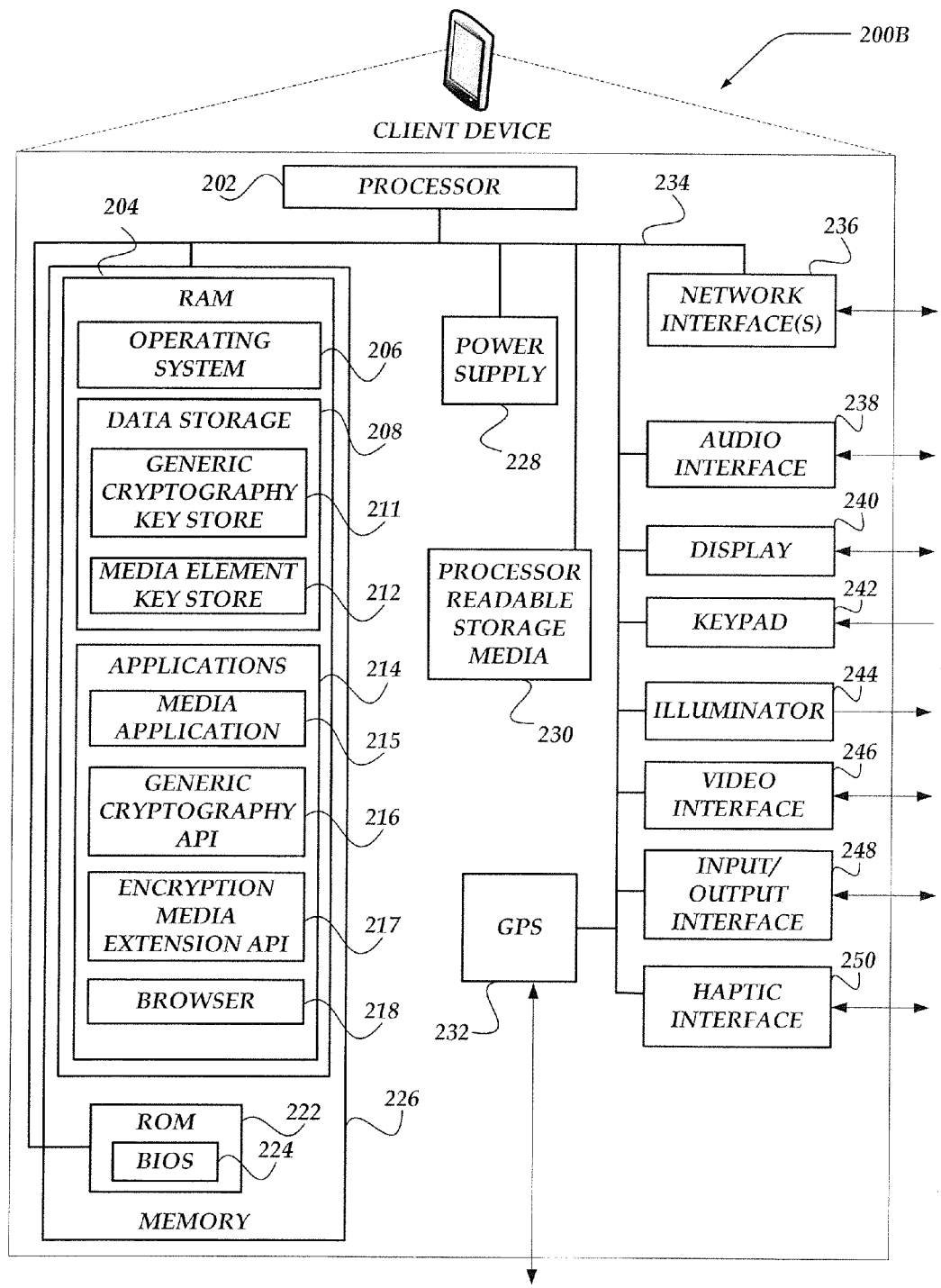

FIG. 2B shows one embodiment of client device 200B that may be included in a system implementing embodiments of the invention. Client device 200B may include many more or less components than those shown in FIG. 2B. However, the components shown are sufficient to disclose an illustrative embodiment for practicing the present invention. Client device 200B may represent, for example, one embodiment of at least one of client devices 102-105 of FIG. 1.

In some embodiments, client device 200B may be an alternative embodiment of client device 200A of FIG. 2A, where like reference numbers indicate similar or equivalent elements. For example, as shown in the figure, client device 200B includes a processor 202 in communication with a mass memory 226 via a bus 234. Client device 200B also includes power supply 228, processor readable storage media 230, one or more network interfaces 236, audio interface 238, display 240, keypad 242, illuminator 244, video interface 246, input/output interface 248, haptic interface 250, and global positioning system (GPS) receiver 232. Memory 226 may include RAM 204 and ROM 222 (which may include BIOS 224). RAM 204 may include operating system 206, data storage 208, and applications 214.

In at least one embodiment, data storage 208 may also include generic cryptography key store (GCKS) 211 and media element key store (MEKS) 212. GCKS 211 may be configured to store at least one key that may be utilized by GCAPI 216 for cryptographic operations. In some embodiments, the keys stored by GCKS 211 may be utilized by GCAPI 216 to generated a second key based on a first key (e.g., from one encryption type to another encryption type that is supported by browser 218). MEKS 212 may be configured to store at least one key that may be utilized by browser 218 using the media elements, encrypted media extension API (EMEAPI) 217, or the like, for cryptographic operations. In at least one embodiment, GCAPI 216 may be enabled to provide keys to MEKS 212 for use by browser 218.

In some embodiments, GCKS 211 and MEKS 212 may be distinct and/or separate stores. In at least one embodiment, browser 218 and/or EMEAPI 217 may not be enabled to access GCKS 211. In another embodiment, GCAPI 216 and browser 218 may both have access to the separate stores. In other embodiments, GCKS 211 and MEKS 212 may be a shared store, where both GCAPI 216 and browser 218 have access to the shared store.

Applications 214 may include media application 215, generic cryptography API 216, encrypted media extension API 217, and browser 218. EMEAPI 217 may be configured to provide explicit support for decrypting encrypted content in HTML. In at least one embodiment, EMEAPI 217 may enable decryption of encrypted content through the media elements, such as an encrypted media extension API. In some embodiments, there may be explicit support for sharing keys between GCAPI 216 and EMEAPI 217, and in other embodiments, there may be no explicit support. EMEAPI 217 may, in some embodiments, be an add-on or other interface of browser 218. In some other embodiments, GCAPI 216 and EMEAPI 217 may be configured as a single cryptography module, DRM system, or the like. In at least one of various embodiments, the GCAPI 216 and/or the EMEAPI 217 may enable selection/specification of the cryptography module, DRM system, or the like to be employed.

In any event, media application 215, GCAPI 216, EMEAPI 217, and browser 218 of FIG. 2B may employ processes, or parts of processes, similar to those described in conjunction with FIGS. 9-13, to perform at least some of its actions.

Illustrative Network Device

Figure 3:
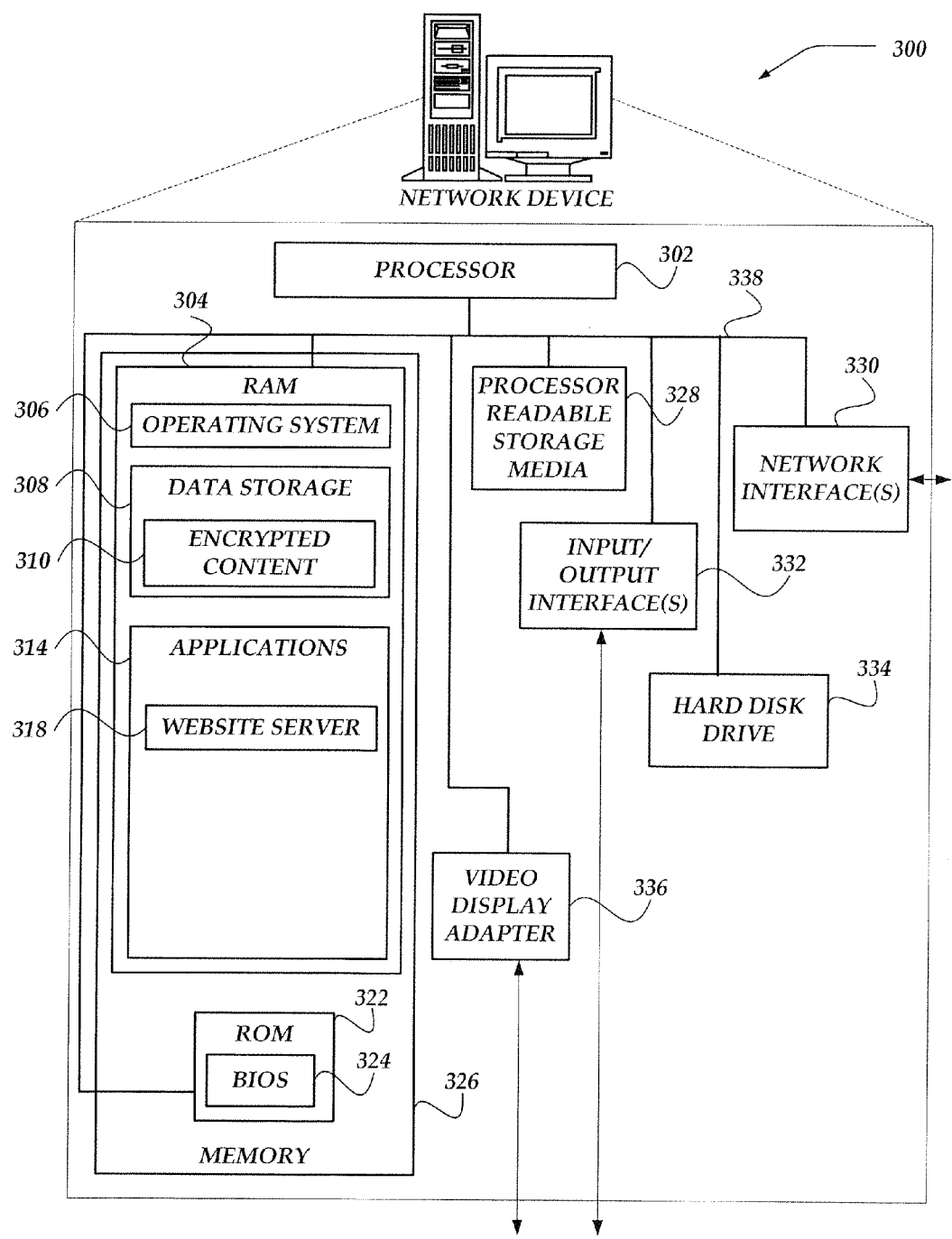
FIG. 3 shows an embodiment of a network device that may be included in a system such as that shown in FIG. 1.

FIG. 3 shows one embodiment of a network device 300, according to one embodiment of the invention. Network device 300 may include many more or less components than those shown. The components shown, however, are sufficient to disclose an illustrative embodiment for practicing the invention. Network device 300 may be configured to operate as a server, client, peer, a host, or any other device. Network device 300 may represent, for example ECPSD 112 of FIG. 1, and/or other network devices.

Network device 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network device 300 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network device 300 also comprises input/output interface 332 for communicating with external devices, such as a keyboard, or other input or output devices not shown in FIG. 3. Input/output interface 332 can utilize one or more communication technologies, such as USB, infrared, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network device 300. Any general-purpose operating system may be employed. Basic input/output system (BIOS) 324 is also provided for controlling the low-level operation of network device 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and nonremovable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computing device.

Memory 326 further includes one or more data storage 308, which can be utilized by network device 300 to store, among other things, applications 314 and/or other data. For example, data storage 308 may also be employed to store information that describes various capabilities of network device 300. The information may then be provided to another device based on any of a variety of events, including being sent as part of a header during a communication, sent upon request, or the like. Data storage 308 may also be employed to store messages, web page content, or the like. At least a portion of the information may also be stored on another component of network device 300, including, but not limited to processor readable storage media 328, hard disk drive 334, or other computer readable storage medias (not shown) within client device 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network device 300, including, but not limited to processor-readable storage media 328, hard disk drive 334, or the like. Data storage 308 may also include encrypted content 310. Encrypted content 310 may include the encrypted content, keys associated with the encrypted content, or the like.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318.

Website server 318 may represents any of a variety of information and services that are configured to provide content, including messages, over a network to another computing device. Thus, website server 318 can include, for example, a web server, a File Transfer Protocol (FTP) server, a database server, a content server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Embodiment Scenario Illustration

Figure 4:
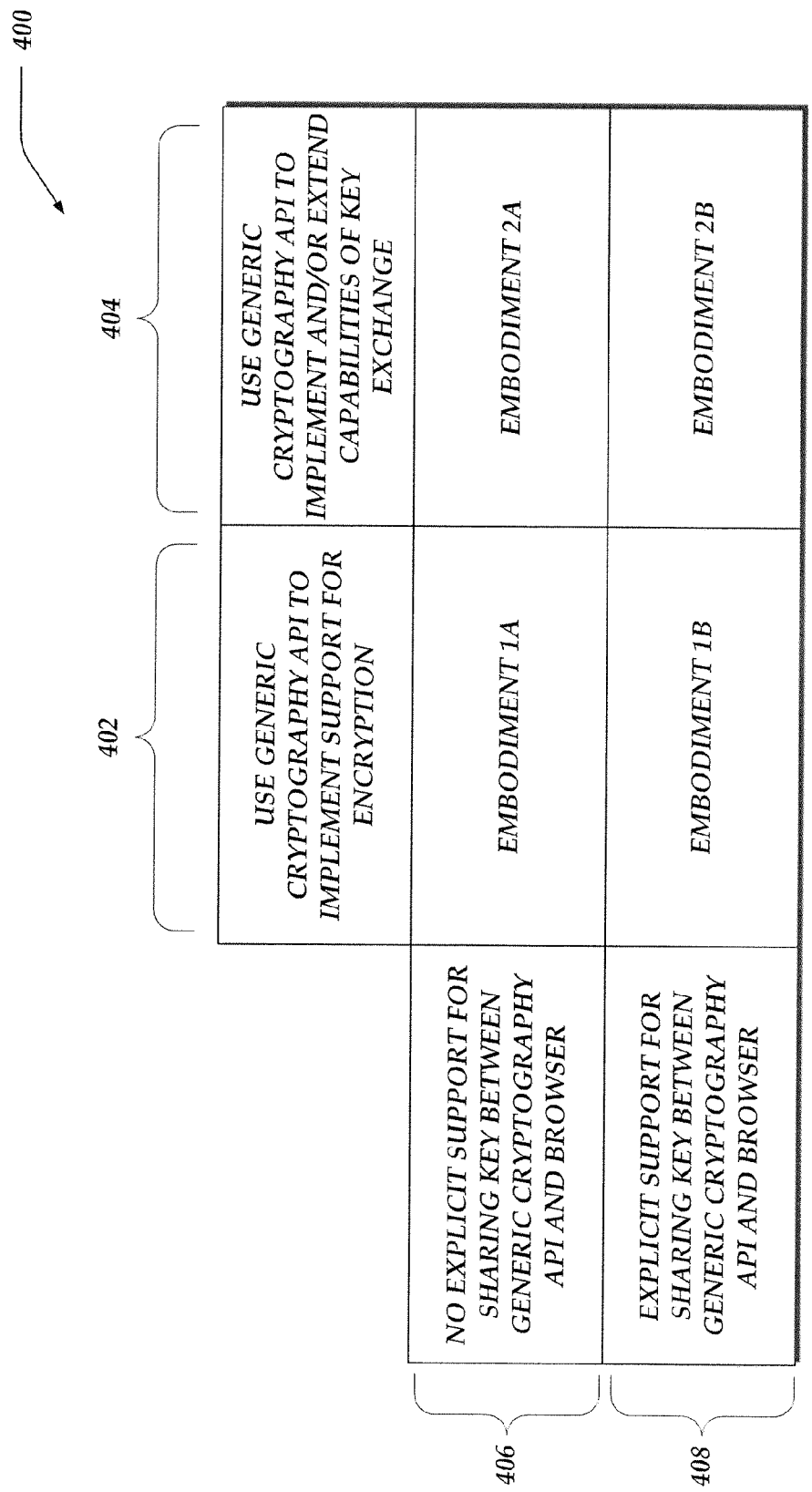
FIG. 4 shows an illustrative table depicting different scenarios in which embodiments may be employed.

FIG. 4 illustrates a table depicting different scenarios in which embodiments may be employed, which may be referred to as embodiments 1A, 1B, 2A, and 2B. Table 400 may include columns 402 and 404 and rows 406 and 408. Embodiment 1A is described in more detail below in conjunction with FIG. 6. Embodiment 1B is described in more detail below in conjunction with FIG. 7. Embodiment 2A is described in more detail below in conjunction with FIG. 9. Embodiment 2B is described in more detail below in conjunction with FIG. 10.

Column 402 may include embodiments where a generic cryptography API (GCAPI), such as GCAPI 216 of FIG. 2A, may be utilized to implement support for content encryption/decryption operations. These embodiments may be referred to herein as embodiments 1A and/or 1B.

Column 404 may include embodiments where the GCAPI may be utilized to implement and/or extend browser capabilities of key exchange for encrypted content. In some embodiments, the GCAPI may be utilized to obtain a key, while an encrypted media extension API may enable decryption of the encrypted content to be performed with the key. For example, the encrypted media extension API may provide a key exchange mechanism to enable the browser's media engine to utilize the obtained key to perform the decryption of the encrypted content. These embodiments may be referred to herein as embodiments 2A and/or 2B.

Row 406 may include embodiments where there may be no explicit support for sharing keys between the GCAPI and the browser using the media elements. These embodiments may be referred to herein as embodiments 1A and/or 2A.

Row 408 may include embodiments where there may be explicit support for sharing keys between the GCAPI and the browser using the media elements. These embodiments may be referred to herein as embodiments 1B and/or 2B.

General Operation

Figure 5:
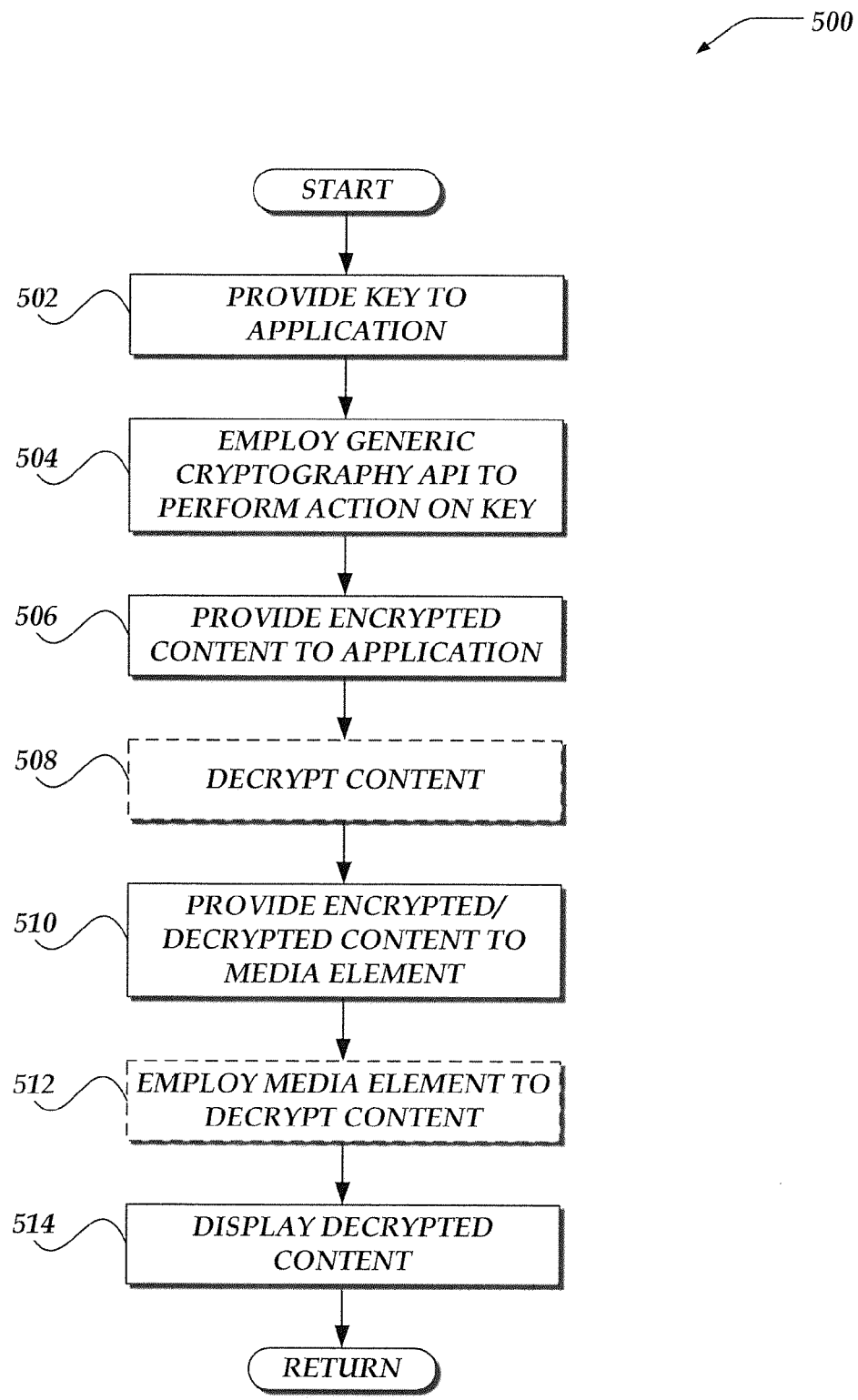
FIG. 5 illustrates a logical flow diagram generally showing one embodiment of an overview process for utilizing a generic cryptography API to support decryption of encrypted content.

The operation of certain aspects of the invention will now be described with respect to FIGS. 5-13. FIG. 5 illustrates a logical flow diagram generally showing one embodiment of an overview process for utilizing a generic cryptography API to support decryption of encrypted content. In some embodiments, process 500 of FIG. 5 may be implemented by and/or executed on one or more network devices, such as client devices 200A-200B of FIGS. 2A-2B.

Process 500 begins, after a start block, at bock 502, where a key may be provided to an application. The application may be a web application that is separately operating on a browser (i.e., a browser application). Embodiments described herein that reference a browser and/or browser application may also include and/or apply to other types of user agents. In some embodiments, the application may explicitly request a key from a server, such as ECPSD 112 of FIG. 1. In such an embodiment, the server may provide the requested key to the application. In other embodiments, the application may request encrypted content from a content server, such as ECPSD 112 of FIG. 1. In at least one such embodiment, the content server may provide a key associated with the requested encrypted content to the application.

As described in more detail below, the key may be employed to decrypt encrypted content. However, embodiments are not so limited, and the key may be utilized to, for example, verify licenses, provide data rights management (DRM) functionality, device verification, or the like. The key may be generated by employing any of a number of cryptographic mechanisms, including, but not limited to Advanced Encryption Standard (AES), Data Encryption Standard (DES), International Data Encryption Algorithm (IDEA), Diffie-Hellman, or any other suitable encryption algorithm.

In some other embodiments, the key itself may be encrypted and may need to be decrypted before it can be employed to decrypt encrypted content. In at least one embodiment, the key may be encrypted based on a platform key, a decryption module key, or the like, or any combination thereof. In at least one embodiment, the platform key may be unique to the network device that is executing the application and/or browser.

If the key is encrypted, the key may be decrypted by employing any of a number of different embodiments. For example, in some embodiments, the application may employ a generic cryptography API (GCAPI) to decrypt the encrypted key, such as is described in more detail below in conjunction with block 504. In at least one such embodiment, the GCAPI may decrypt the encrypted key based on the platform key that corresponds to the network device.

In other embodiments, the application may be enabled to access a corresponding platform key to decrypt the encrypted key. In at least one embodiment, the application may not directly access the corresponding platform key, but may rather access and/or use the corresponding platform key via the GCAPI. In some other embodiments, the application may provide the encrypted key to the browser/media element.

In yet other embodiments, the application may provide the encrypted key to the browser/media element, where the browser may employ a main decryptor (e.g., a decryption module) to decrypt the encrypted key. In at least one embodiment, the main decryptor may employ one or more available APIs (e.g., the GCAPI; an API provided by the operating system, firmware, and/or hardware; or the like) to enable decryption of the encrypted key based on the platform key. In another embodiment, the main decryptor may employ the one or more available APIs to enable decryption of the content and the encrypted key based on the platform key. The main decryptor may utilize the decrypted key to further process and/or decrypt the content. In yet another embodiment, the main decryptor may extract an encrypted key from a license, then employ the one or more available APIs to further process and/or enable decryption of the encrypted key. However, embodiments are not so limited and other methods for decrypted an encrypted key may be employed, such as, for example, a combination of one or more of the embodiments described above. In some embodiments, media element, media engine, and/or browser may refer to a browser or libraries and the components used to handle media playback (e.g., via HTML5 media elements).

In some embodiments, the platform key may be a shared key or a public-private key pair. In at least one embodiment of the public-private key pair, the platform may employ the private key to decrypt and/or sign content, such that the private key is not available above and/or outside the level or device that contains it. In another embodiment, the private key may be unique to the platform. In some other embodiments, platform key may be a pre-provisioned key, from a key box, the result of certificate enrollment, or the like. In some other embodiments, the shared or public key may be provided to the content provider/application by encrypting it with a shared or public key for the content provider/application, signing it with a trusted key (e.g., in the TPM), using a PKI, the key may be provided a priori, or the like, or any combination thereof.

In other embodiments, platform keys may include keys stored in hardware, such as, but not limited to, a Trusted Platform Module (TPM) or burned into other chips; generated or tied to firmware or Operating System installation; generated or tied to an application installation; dongle; smartcard; "fob"; wirelessly (i.e. Bluetooth of WiFi) connected device; or the like.

In at least one embodiment, a plurality of platform keys and/or levels of platform keys and/or wrapping may be employed. In some embodiments, there may be multiple levels of signing (signature chaining) of platform key(s), which can be used to verify the authenticity of the key being provided.

In some embodiments, standard cryptographic practices, such as nonces, may be used to ensure the authenticity of a device, prevent replay attacks, or the like. In at least one embodiment, decryption operation may include converting from one type of handle to another, such as, for example, PKCS#11's C_UnwrapKey operation.

In some other embodiments, the platform key (shared or private) may be exposed, signed, and/or encrypted in a number of different ways, including, but not limited to, an API/property exposing the platform key, an API exposing signing with the platform key, an API exposing encrypting with the platform key, or the like. In some embodiments, such APIs may be part of a Web Cryptography API, the media element, or the like.

In at least one embodiment, the platform key may be employed to sign data used in the acquisition, issuance, maintenance, etc. of a key/license. In various embodiments, the signed data may, for example, be a license request and/or user authentication token. In some embodiments, a plurality of levels of signing or parallel signatures, such as by both the platform key and the decryption module's key may be employed.

In some embodiments, the application may employ the GCAPI to utilize the platform key to sign data from the browser/media element/decryption module and to provide the signed data to the content provider/application. In other embodiment, the application may access the platform key and sign the data. In some other embodiments, the media element/browser may employ one or more available APIs to sign the data based on the platform key. The browser may provide the signed data to the content provider/application. In yet other embodiments, the decryptor/decryption module may employ one or more available APIs to sign the data based on the platform key. The decryptor/decryption module may provide the signed data to the media element/browser, which may provide it to the content provider/application.

In some other embodiments, the device executing the browser may be verified as an authorized device to display and/or decrypt the encrypted content. If the device is affirmatively authorized, then a domain key may be provided to the device. In at least one embodiment, the domain key may be provided to the browser via the GCAPI. In some embodiments, the domain key may be utilized to decrypt encrypted keys associated with the encrypted content. In at least one embodiment, a backend implementation of an encrypted media extension API may be enabled to access the domain key in the GCAPI and to perform and/or enable decryption of the encrypted content keys with the domain key.

In any event, process 500 continues at block 504, where a generic cryptography API (GCAPI) may be employed to perform an action on the key. In at least some embodiments, the GCAPI may be employed by the browser application. As described above, in some embodiments, employing the GCAPI by the browser application may also refer to employing the implementation of the GCAPI. In at least one embodiment, the application may provide the key to the GCAPI. The actions performed by the GCAPI may include, but are not limited to, decrypting encrypted keys, generating other keys based on a provided key, converting keys associated with one encryption type to keys associated with a different encryption type, extract the key from a license, or the like.

For example, in some embodiments, if the key is encrypted, the GCAPI may decrypt the encrypted key (which is described in more detail below in conjunction with FIG. 8). In other embodiments, if the key is associated with an encryption type not supported by the browser (i.e., the media elements and/or an encrypted media extension API), then the GCAPI may generate another key based on the key, where the other key is associated with an encryption type that is supported by the browser. However, embodiments are not so limited and other actions associated with key exchanges may be employed.

In at least one of various embodiments, the GCAPI may store the key. In some embodiments, the GCAPI may store the key in a key store such as key store 210 of FIG. 2A, generic cryptography key store 211 of FIG. 2B, and/or media element key store 212 of FIG. 2B.

In any event, process 500 next proceeds to block 506, where encrypted content may be provided to the application. In some embodiments, the application may download (e.g., from a content server, such as ECPSD 112 of FIG. 1) and/or otherwise obtain the encrypted content. In at least one embodiment, the encrypted content may be provided by the content server as a media stream. In some other embodiments, the content may be maintained and/or obtained locally to the computing device, such as content from a disk drive, DVD, or the like, for display by a browser on the computing device.

Continuing to block 508, the encrypted content may be decrypted. In at least one embodiment, block 508 may be optional and may not be performed. In some embodiments, the application may utilize the GCAPI to decrypt the content, which is described in more detail below in conjunction with FIG. 6. In other embodiments, the application itself may decrypt the encrypted content.

Process 500 next proceeds to block 510, where the content (unencrypted, encrypted, or decrypted content) may be provided to the browser using the media element, which may also be referred to herein as providing content to the media element. In at least one embodiment, the media element may be operatively supported by the browser. In at least one embodiment, where block 508 is not performed, encrypted content may be provided to the browser using the media element. In another embodiment, where block 508 is performed, the decrypted content may be provided to the browser using the media element. In yet another embodiment, if the content is not encrypted, then the unencrypted content may be provided to the browser busing the media element.

In some embodiments, the browser's media engine may download and initiate playback of encrypted content with the media elements as a result of an action by the application, HTML, or otherwise.

Process 500 continues next at block 512, where, using the media element, the browser may be employed to decrypt the encrypted content. In at least some embodiments, employing a browser to decrypt encrypted content using the media element may be referred to herein as employing the media element to enable the decryption of encrypted content. In at least one embodiment, block 512 may be optional and may not be performed (e.g., when the content is decrypted at block 508 or the content is unencrypted). In some embodiments, the browser may obtain a key from the GCAPI and/or GCKS 211 of FIG. 2 and utilize a backend implementing the media element (e.g., media engine of the browser) to decrypt the encrypted content, which is described in more detail below in conjunction with FIG. 7. In other embodiments, the browser may utilize an encrypted media extension to obtain a key and/or to decrypt the encrypted content. In at least one such embodiment, the application may obtain the key from the GCAPI and provide it to the browser using the media element, which is described in more detail below in conjunction with FIG. 9. In another embodiment, the browser (e.g., the encrypted media extension API) may directly and/or explicitly request/obtain the key from the GCAPI, which is described in more detail below in conjunction with FIG. 10. In at least one of the various embodiments, a reference to the key (e.g., a handle to the key), and not the key itself, may be provided.

In any event, process 500 continues at block 514, where the decrypted content may be displayed. In at least one embodiment, display of decrypted content may include rendering the decrypted content in the browser for display to a user of the client device.

After block 514, process 500 may return to a calling process to perform other actions.

Figure 6:
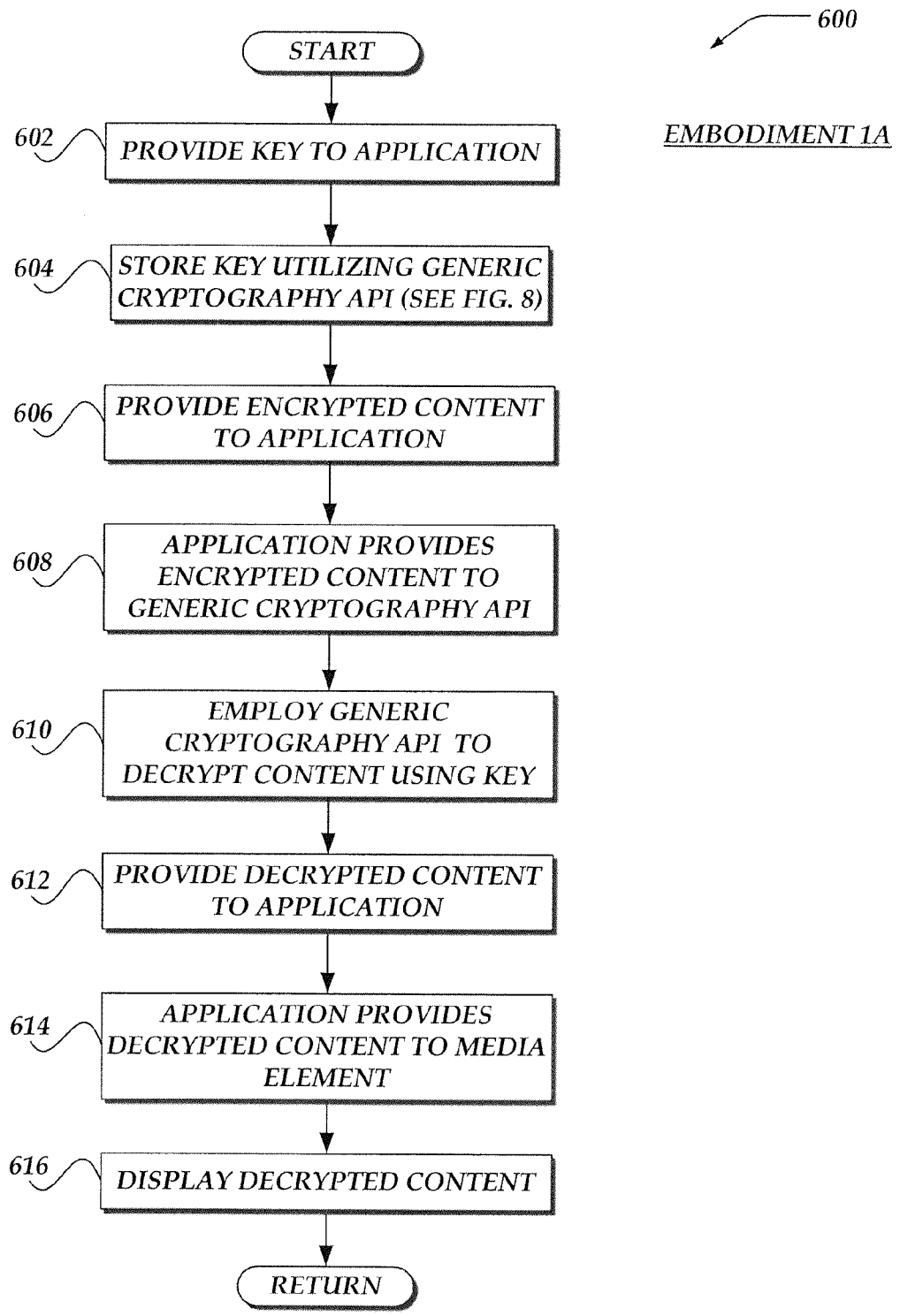
FIG. 6 illustrates a logical flow diagram generally showing an embodiment of a process for employing a generic cryptography API to perform key exchange and to decrypt encrypted content.

FIG. 6 illustrates a logical flow diagram generally showing an embodiment of a process for employing a generic cryptography API to perform key exchange and to decrypt encrypted content. In some embodiments, process 600 of FIG. 6 may be implemented by and/or executed on one or more network devices, such as client device 200A of FIG. 2A. In at least one embodiment, process 600 may be referred to as embodiment 1A in FIG. 4.

Process 600 begins, after a start block, at block 602, where a key may be provided to an application. In at least one embodiment, block 602 may employ embodiments of block 502 of FIG. 5 to provide a key to an application.

Process 600 continues at block 604, where the key may be stored utilizing the GCAPI. In some embodiments, the key may be unencrypted and may be stored via the GCAPI. In other embodiments, the key may be encrypted and the GCAPI may be employed to decrypt and/or store the encrypted key, which is described in more detail below in conjunction with FIG. 8.

Process 600 proceeds to block 606 where encrypted content may be provided to the application. In at least one embodiment, the application may receive encrypted content from a content server, such as ECPSD 112 of FIG. 1. In some embodiments, block 606 may employ embodiments of block 506 of FIG. 5 for providing encrypted content to the application.

Process 600 continues next at block 608, where the application may provide the encrypted content to the GCAPI. In some embodiments, the application may provide the entire amount of encrypted content to the GCAPI or portions of the encrypted content (i.e., less than the entire amount of encrypted content) to the GCAPI. In at least one embodiment, the application may provide one or more blocks of the encrypted content to the GCAPI at a time to be decrypted. The size of the blocks may be based on size of the encrypted content, a transmission rate of receiving the encrypted content, type of encrypted content, or the like.

Although not shown in FIG. 6, in at least one of various embodiments, the application may not provide the encrypted content to the GCAPI, but may instead request the key from the GCAPI and decrypt the content itself. In at least one such embodiments, after the application decrypts the encrypted content, process 600 may flow (not shown) to block 614.

In any event, process 600 proceeds to block 610, where the GCAPI may be employed to decrypt the encrypted content using the previously provided key. In some embodiments, the encrypted content, such as metadata associated with the encrypted content, may include a key ID (identifier). The key ID may identify the particular key associated with the encrypted content. In some embodiments, the GCAPI may have previously stored the key based on the key ID (e.g., at block 604). The application may extract the key ID from the encrypted content metadata and provide it to the GCAPI. The GCAPI may obtain the key from the key store based on the key ID. The GCAPI may utilize the obtained key to decrypt the encrypted content. In some embodiments, the GCAPI may decrypt one or more blocks of encrypted content at a time. In some embodiments, process 600 may loop between at least blocks 608, 610, and 612 for each block of encrypted content.

Process 600 next proceeds to block 612, where the GCAPI may provide the decrypted content to the application. As described above, the GCAPI may decrypt one or more blocks of encrypted content at a time. In at least one such embodiment, the GCAPI may provide the one or more blocks of decrypted content to the application. In other embodiments, the GCAPI may decrypt the entire amount of encrypted content before provided the decrypted content to the application.

In other embodiments, the GCAPI may support decrypting streams of content. In at least one such embodiment, a handle to the decrypted media stream may be provided to the media element (e.g., <video>.src=decrypted stream url). Providing the handle to the media element may avoid providing blocks of decrypted content to the application.

In any event, process 600 proceeds to block 614, where the application may provide the decrypted content to the browser using and/or otherwise based on the media element. In at least one embodiment, the application may utilize another API, such as Media Source API, to provide the content to the browser. As described above, providing decrypted content to the browser using the media element may also be referred to herein as providing the decrypted content to the media element.

Process 600 continues at block 616, where, using the media element, the browser may enable display of the decrypted content. In at least one embodiment, block 616 may employ embodiments of block 514 of FIG. 5 to display the decrypted content.

After block 616, process 600 may return to a calling process to perform other actions.

Figure 7:
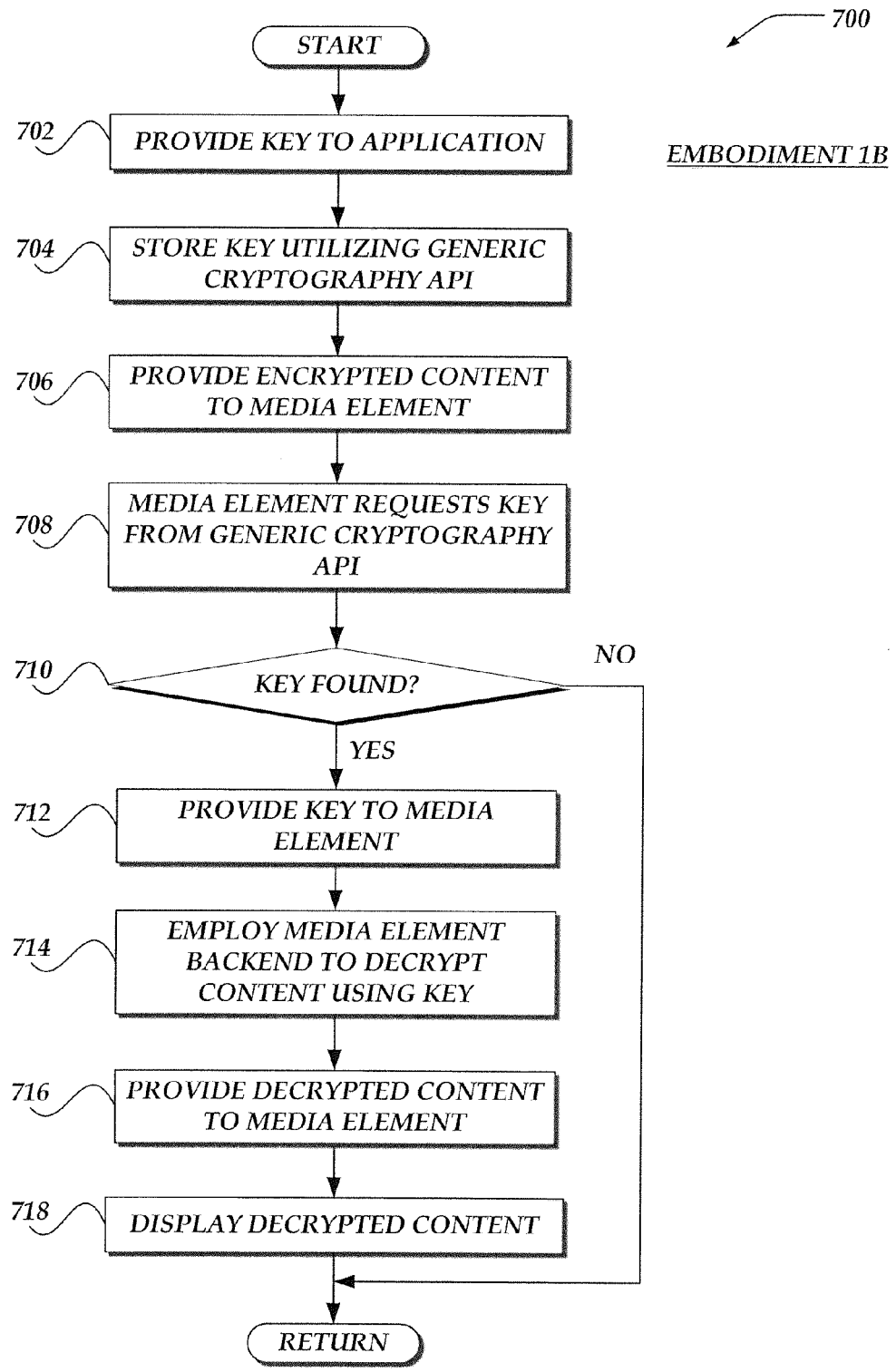
FIG. 7 illustrates a logical flow diagram generally showing another embodiment of a process for employing a generic cryptography API to perform key exchange and to decrypt encrypted content.

FIG. 7 illustrates a logical flow diagram generally showing another embodiment of a process for employing a generic cryptography API to perform key exchange and to decrypt encrypted content. In some embodiments, process 700 of FIG. 7 may be implemented by and/or executed on one or more network devices, such as client device 200A of FIG. 2A. In at least one embodiment, process 700 may be referred to as embodiment 1B in FIG. 4.

Process 700 begins, after a start block, at block 702, where a key may be provided to an application. In at least one embodiment, block 702 may employ embodiments of block 502 of FIG. 5 to provide a key to an application.

Process 700 continues at block 704, where the key may be stored utilizing the GCAPI. In at least one of various embodiments, block 704 may employ embodiments of block 604 of FIG. 6. In at least one embodiment, the key may be stored based on a key ID. In some embodiments, the key ID may be utilized to retrieve and/or access the key, which may then be utilized to decrypt encrypted content.

Process 700 proceeds to block 706, where encrypted content may be provided to the browser using the media element (also referred to as providing encrypted content to the media element). The encrypted content may include the key ID. In at least one embodiment, metadata associated with the encrypted content may include the key ID. In at least one embodiment, the encrypted content may be provided to the browser through the application. In at least one embodiment, the application may download an encrypted media stream and provide it to the browser. In other embodiments, the browser's media engine may download and start playback of the encrypted content. In at least one embodiment, the encrypted content may be provided by the content server as a media stream.

In any event, process continues next at block 708, where the browser may request a key from the GCAPI using and/or otherwise based on the media element (also referred to as the media element requesting a key from the GCAPI). In some embodiments, metadata associated with the encrypted content may include a key ID. Using the media element, the browser may extract the key ID and provide it to the GCAPI to request the key.

Process 700 continues at decision block 710, where a determination may be made whether the key is found by the GCAPI. If the key that corresponds to the encrypted content is not previously provided to the GCAPI, then the key may not be stored by the GCAPI and may not be found. In some embodiments, the GCAPI may locate a key by searching a table, list, or other data structure of key IDs. If the data structure includes the key ID, then the key that corresponds to the encrypted content may be found. If the key is found, then process 700 may flow to block 712; otherwise, and the GCAPI may notify the browser that the key was not found and process 700 may return to a calling process to perform other actions.

At block 712, the GCAPI may explicitly provide the key to the browser using and/or otherwise based on the media element (also referred to as providing the key to the media element). In some embodiments, the GCAPI may provide the key itself, such as through a secure method. In other embodiments, the GCAPI may provide a reference and/or access mechanism to the key, such as a handle to the key. In at least one embodiment, the GCAPI and the browser may be configured to communicate and share keys with each other.

Process 700 proceeds to block 714, where a backend of the media element may be employed to decrypt the encrypted content using the key. In at least one embodiment, a media engine of the browser may be employed to use the key to decrypt the encrypted content. However, embodiments are not so limited and other functionality of the browser may be employed to decrypt the encrypted content.

In some other embodiments, the GCAPI may be employed to decrypt the encrypted content. In at least one embodiment, the browser may provide blocks of encrypted content to the GCAPI to be decrypted by employing the key. The GCAPI may return decrypted blocks of content to the browser using the media element.

Process 700 next continues at block 716, where the decrypted content may be provided to the browser using the media element. In at least one embodiment, the media engine may provide the decrypted content to the browser using the media element for decoding and/or rendering.

Process 700 continues at block 718, where the decrypted content may be displayed. In at least one embodiment, block 718 may employ embodiments of block 514 of FIG. 5 to display the decrypted content.

After block 718, process 700 may return to a calling process to perform other actions.

Figure 8:
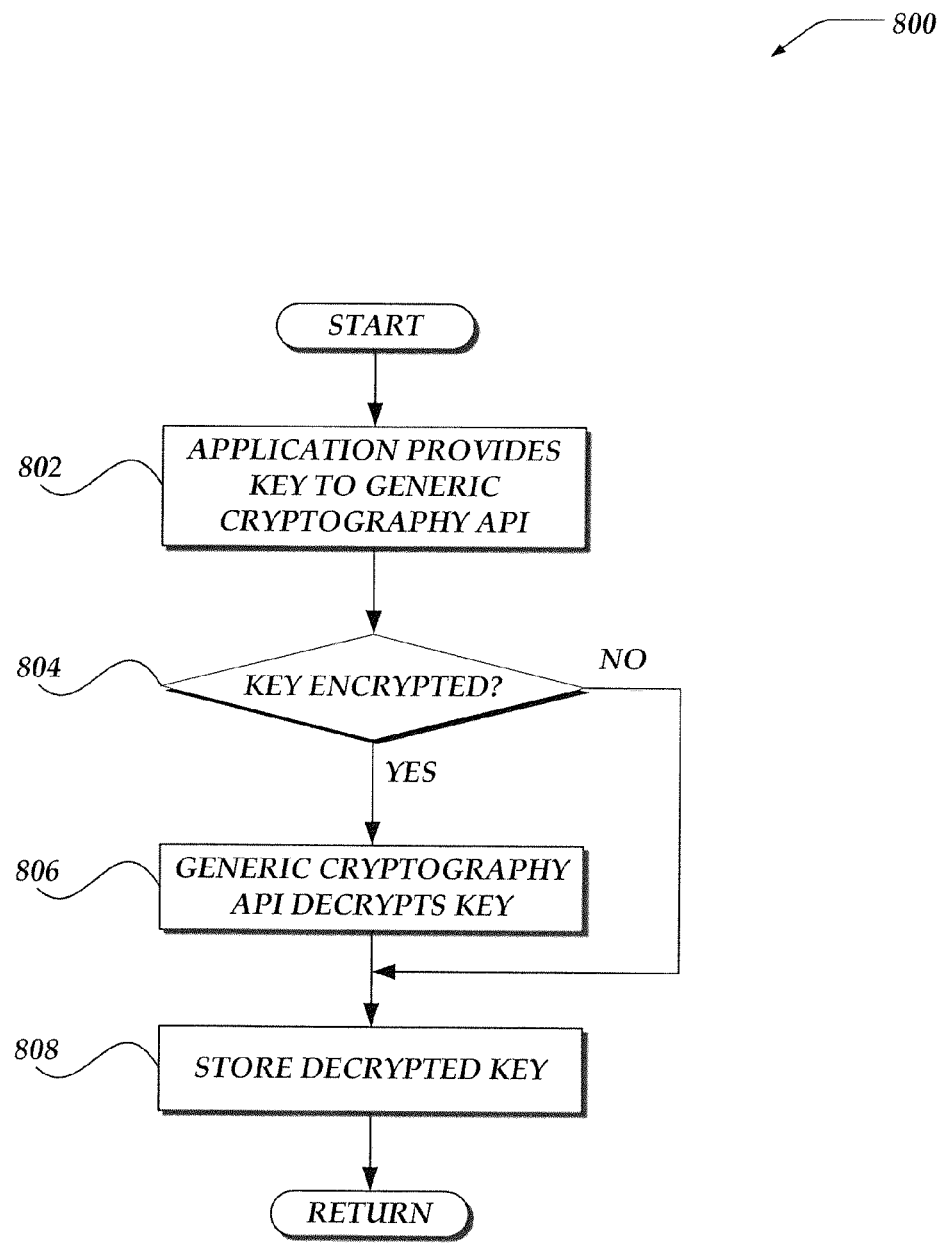
FIG. 8 shows a logical flow diagram generally showing one embodiment of a process for decrypting an encrypted key.

FIG. 8 illustrates a logical flow diagram generally showing one embodiment of a process for decrypting an encrypted key. In some embodiments, process 800 of FIG. 8 may be implemented by and/or executed on one or more network devices, such as client device 200A of FIG. 2A.

Process 800 begins, after a start block, at block 802, where the application may provide the key to the GCAPI. In at least one embodiment, the key may be encrypted and/or may be included in a license.

Process 800 proceeds to decision block 804, where a determination may be made whether the key is encrypted. In at least one embodiment, the key may include an identifier or other indication that the key is encrypted. If the key is encrypted, process 800 may flow to block 806; otherwise, process 800 may flow to block 808.

At block 806, the GCAPI may decrypt the key. In some embodiments, the GCAPI may be enabled to identify an encryption type associated with the encrypted key and employ a suitable decryption algorithm to decrypt the encrypted key.

Process 800 continues to block 808 where the decrypted key may be stored. In some embodiments, the key may be stored in local memory. In other embodiments, the key may be stored in secure memory accessible by the GCAPI. In at least one embodiment, the key may be stored based on a key ID. The key ID may be utilized to obtain and/or access the key for use to decrypt encrypted content.

After block 808, process 800 may return to a calling process to perform other actions.

Figure 9:
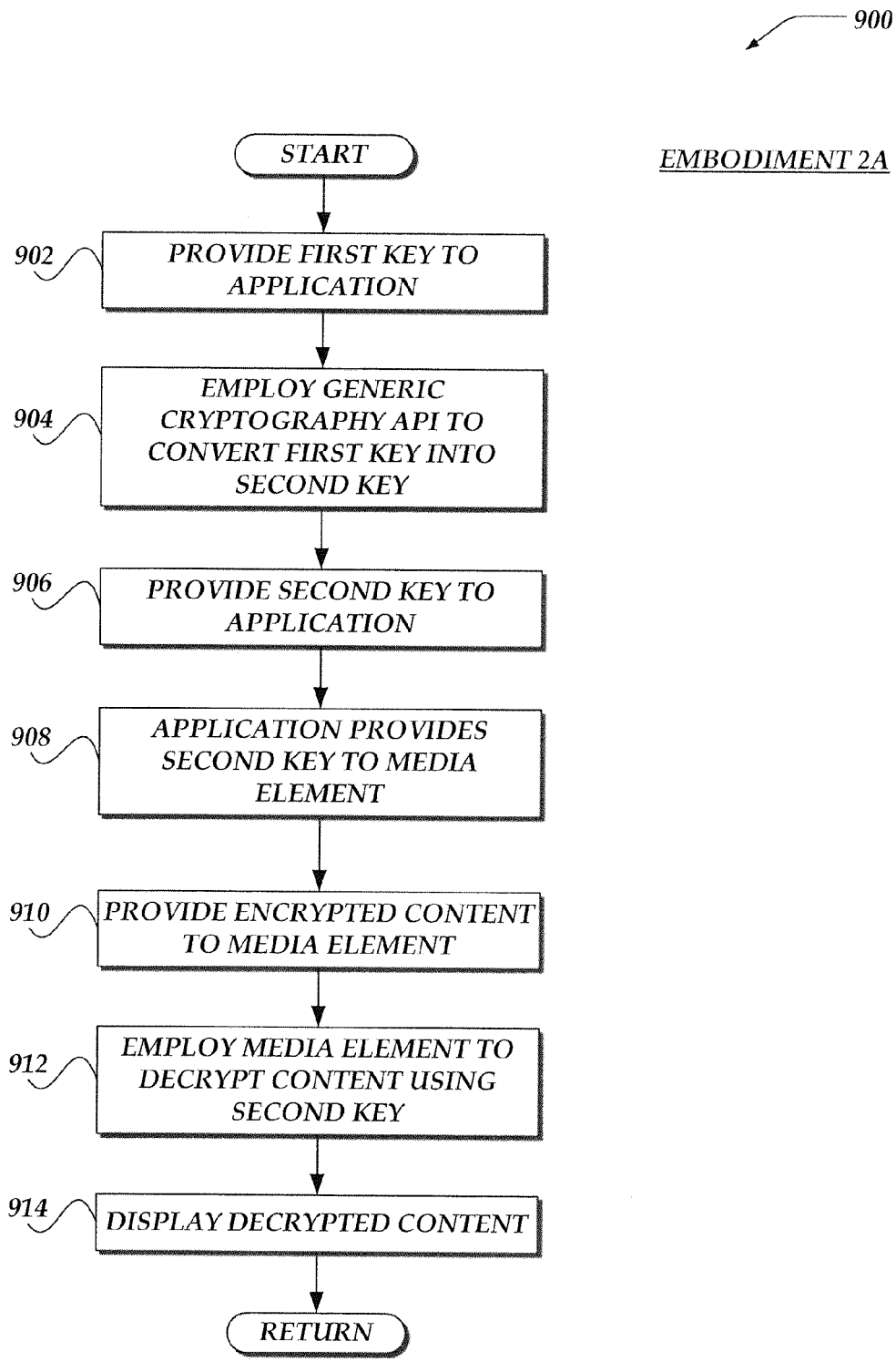
FIG. 9 illustrates a logical flow diagram generally showing an embodiment of a process for employing a generic cryptography API to expand cryptography operations of a browser.

FIG. 9 illustrates a logical flow diagram generally showing an embodiment of a process for employing a generic cryptography API to expand cryptography operations of a browser. In some embodiments, process 900 of FIG. 9 may be implemented by and/or executed on one or more network devices, such as client device 200B of FIG. 2B. In at least one embodiment, process 900 may be referred to as embodiment 2A in FIG. 4.

Process 900 begins, after a start block, at block 902, where a first key may be provided to an application. In at least one embodiment, block 902 may employ embodiments of block 502 of FIG. 5 to provide a key to an application.

Process 900 proceeds to block 904, where the GCAPI may be employed to convert the first key into a second key. In various embodiments, the first key may be encrypted and/or unencrypted. As described above, the GCAPI may be employed to decrypt and/or store an encrypted key (and/or decrypted key).

In some embodiments, the second key may be generated based on the first key. In at least one embodiment, the first key may be associated with an encryption type that is not supported by the browser. In such an embodiment, the GCAPI may be enabled to identify a type of encryption of the key and a type of encryption supported by the browser. Based on the identified types of encryption, the GCAPI may be enabled to convert the first key into a second key that is supported by the browser. In at least one embodiment, an encryption type supported by the browser may refer to an encryption type supported by an encrypted media extension API of a media element.

In another embodiment, the first key may be part of or associated with a license. In such an embodiment, the GCAPI may extract the second key from the license. In yet other embodiments, the first key may be encrypted. In one such embodiment, the GCAPI may be enabled to decrypt the first key (e.g., by a process similar to process 800 of FIG. 8), where the second key is the decrypted key. In another such embodiment, the GCAPI may decrypt the first key prior to generating/converting it into the second key. It should be understood that other types of key exchange may be employed through the GCAPI, such as, but not limited to DRM functionality, device verification, key destruction and/or lifetime management, or the like.

Process 900 continues at block 906, where the GCAPI may provide the second key to the application.

Proceeding to block 908, the application may provide the second key to the browser using and/or otherwise based on the media element. In some embodiments, the application may provide the second key to the browser though an interface, such as by an addKey( )method. In at least one embodiment, the application may provide (e.g., export) the second key to the browser using the media element. In another embodiment, the application may provide a handle to the second key to the browser.

Process 900 next proceeds to block 910, where encrypted content may be provided to the browser using the media element. In at least one embodiment, block 910 may employ embodiments of block 706 of FIG. 7 to provide encrypted content to the browser. In some embodiments, the browser may be provided the key (or a reference to the key) along with the encrypted content from the application.

Process 900 continues at block 912, where, using the media element, the browser may be employed to decrypt the encrypted content using the second key. In some embodiments, the media element may be employed to decrypt the encrypted content using the second key. In at least one embodiment, employing the browser to decrypt encrypted content may include utilizing an encrypted media extension API that is operative to provide keys to the browser's media engine via the media element to enable decryption of the encrypted content.

In any event, process 900 proceeds to block 914, where the decrypted content may be displayed. In at least one embodiment, block 914 may employ embodiments of block 514 of FIG. 5 to display the decrypted content.

After block 914, process 900 may return to a calling process to perform other actions.

Figure 10:
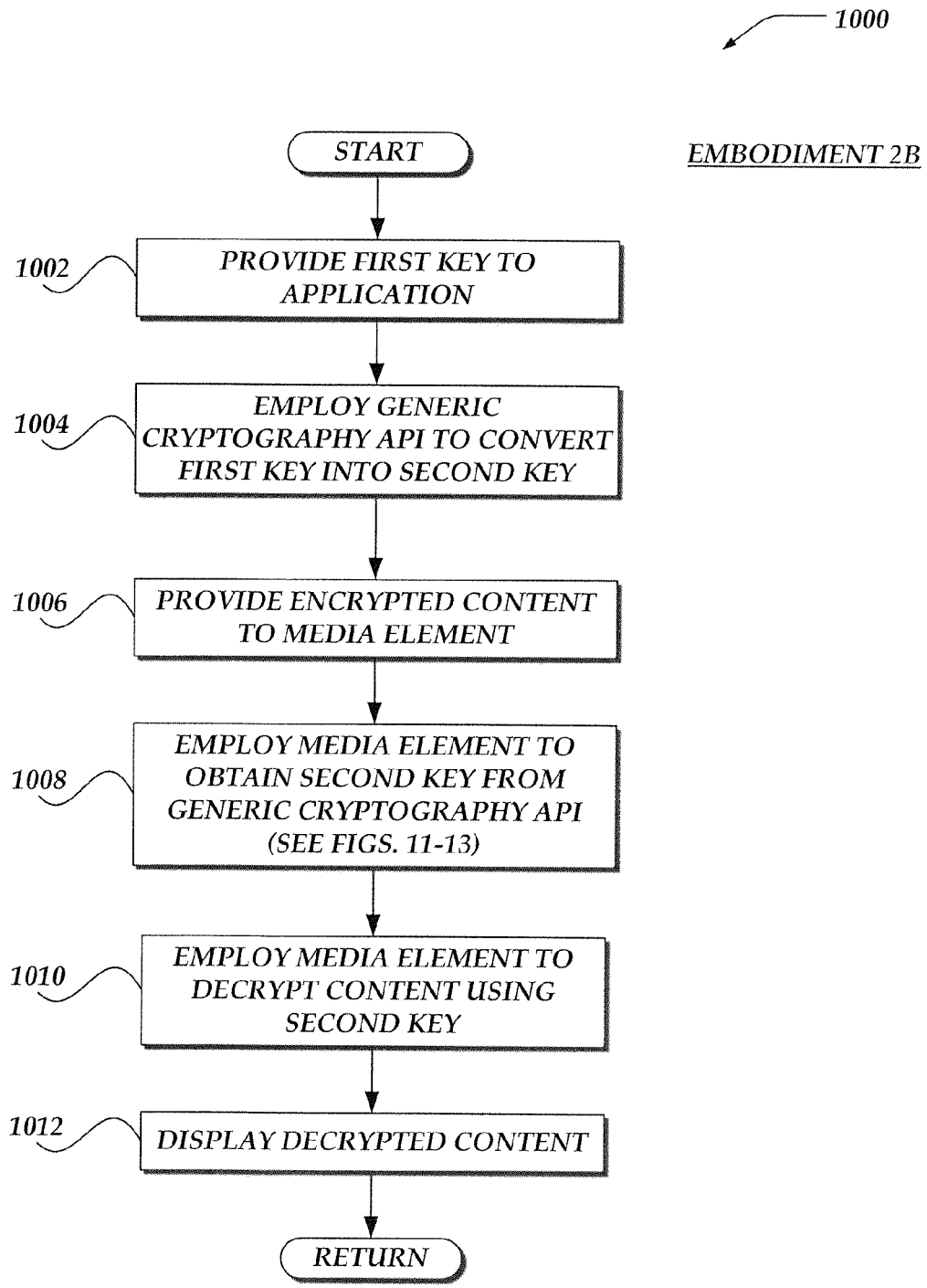
FIG. 10 illustrates a logical flow diagram generally showing another embodiment of a process for employing a generic cryptography API to expand cryptography operations of a browser.

FIG. 10 illustrates a logical flow diagram generally showing another embodiment of a process for employing a generic cryptography API to expand cryptography operations of a browser. In some embodiments, process 1000 of FIG. 10 may be implemented by and/or executed on one or more network devices, such as client device 200B of FIG. 2B. In at least one embodiment, process 1000 may be referred to as embodiment 2B in FIG. 4.

Process 1000 begins, after a start block, at block 1002, where a first key may be provided to an application. In at least one embodiment, block 1002 may employ embodiments of block 902 of FIG. 9 to provide the first key to the application.

Process 1000 proceeds to block 1004, where the GCAPI may be employed to convert the first key into a second key (i.e., generate a second key based on the first key). In at least one embodiment, block 1004 may employ embodiments of block 904 of FIG. 9 to convert the first key into the second key. As in block 904 of FIG. 9, block 1004 may employ the GCAPI to enable other key exchange operations.

Process 1000 continues next at block 1006, where encrypted content may be provided to the browser using the media element. In at least one embodiment, block 1006 may employ embodiments of block 910 of FIG. 9 to provide encrypted content to the browser.

Figure 11:
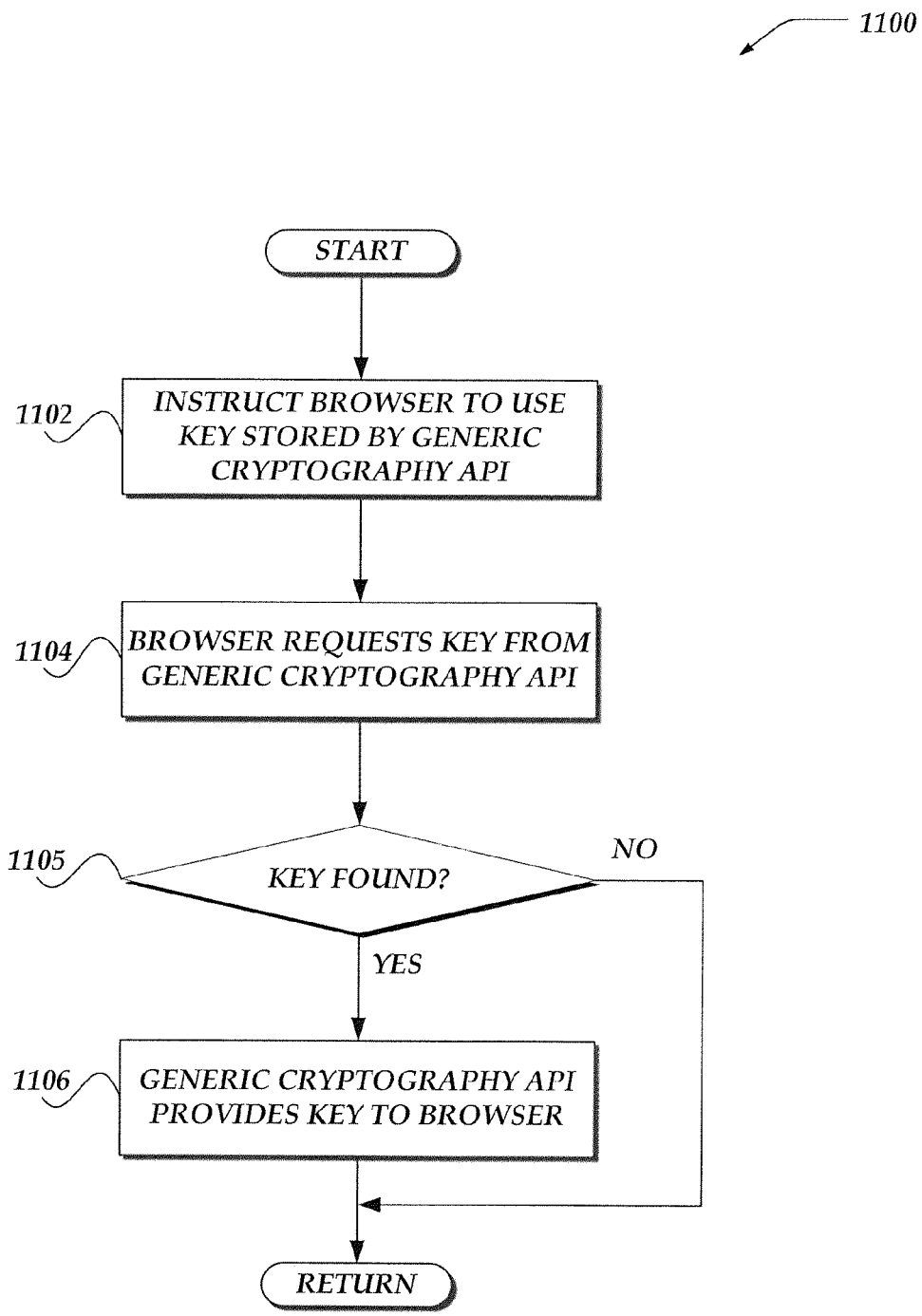
FIG. 11 illustrates a logical flow diagram generally showing an embodiment of a process for employing a browser to obtain a key from a generic cryptography API based on a media element.
Figure 12:
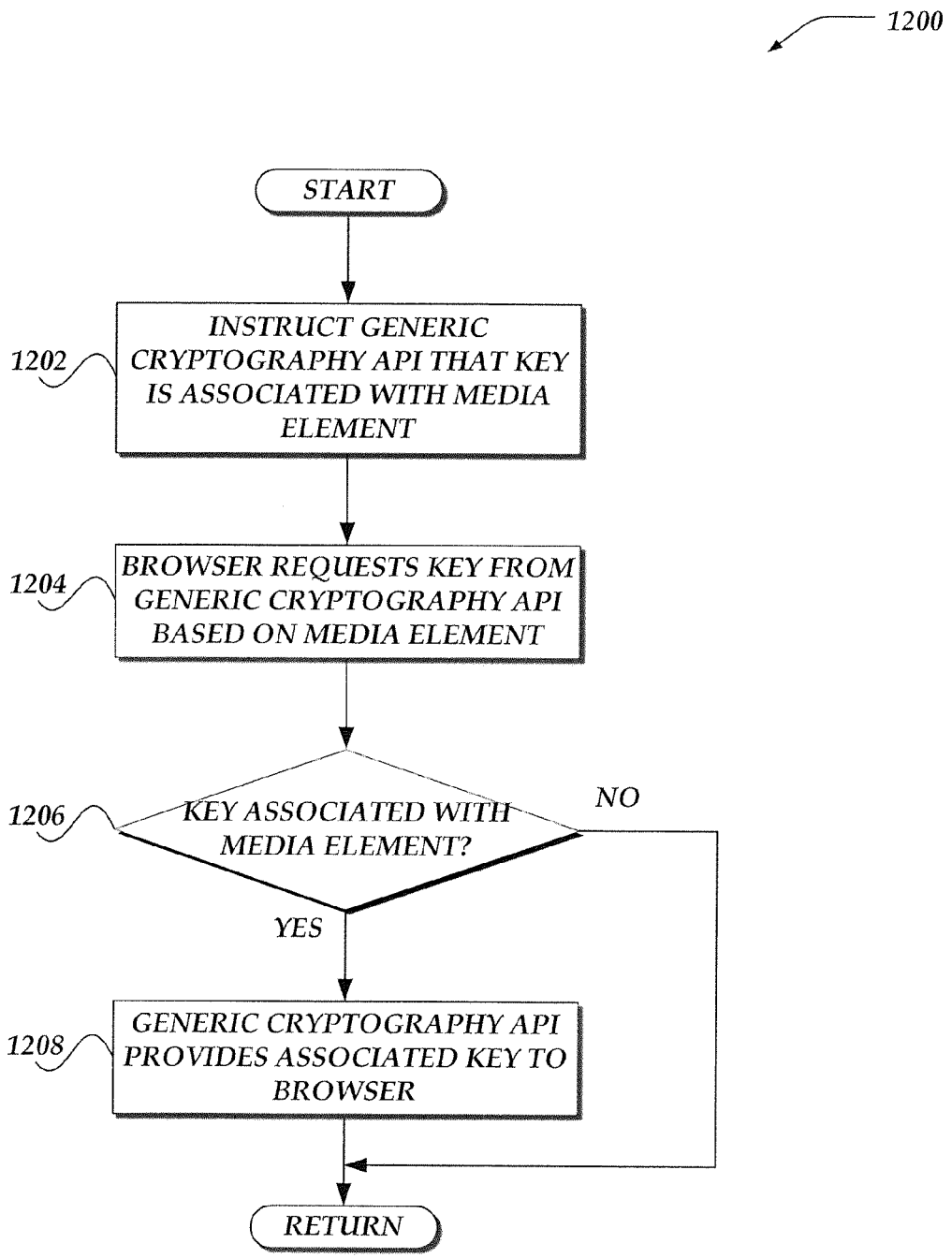
FIG. 12 illustrates a logical flow diagram generally showing another embodiment of a process for employing a browser to obtain a key from a generic cryptography API based on a media element.
Figure 13:
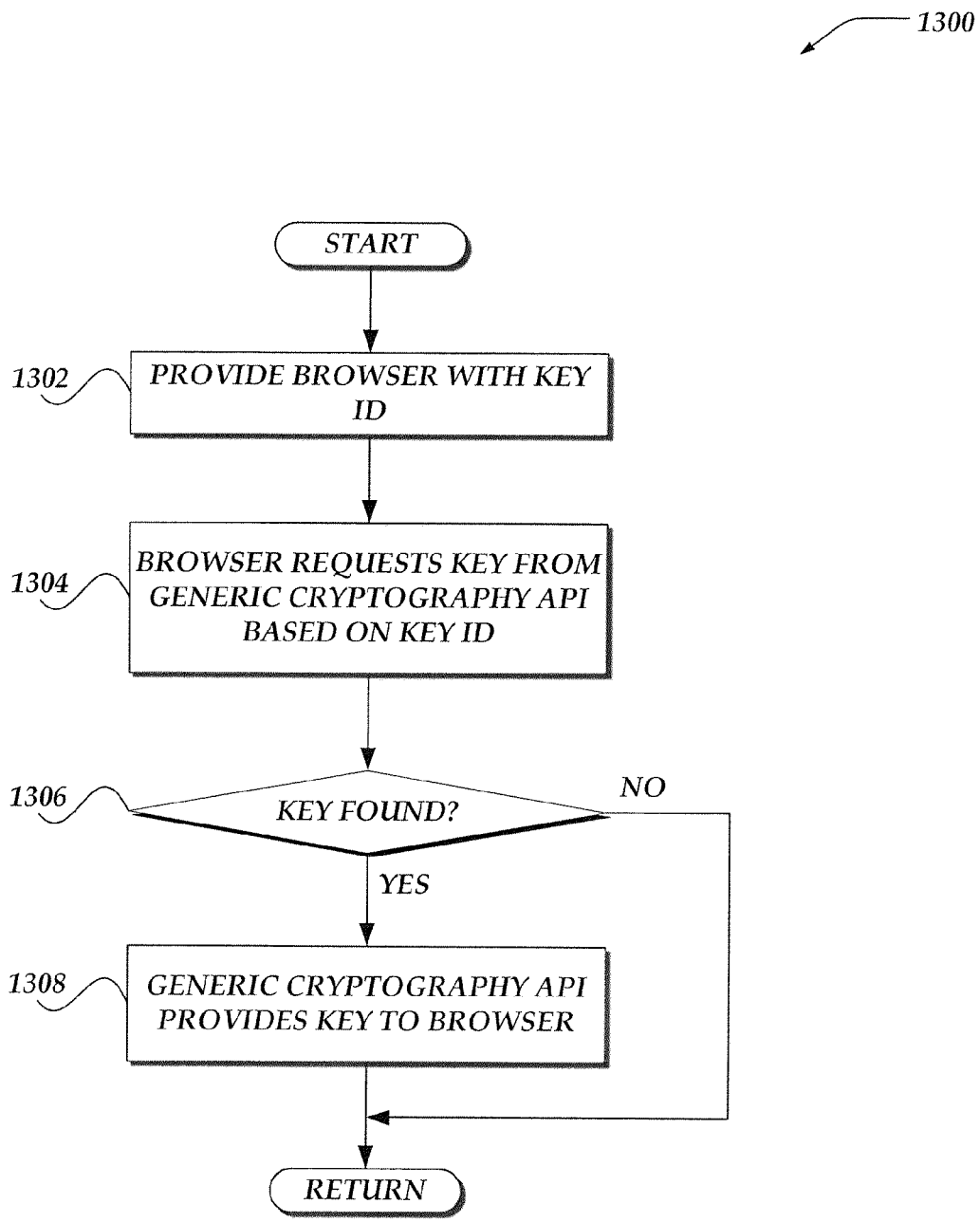
FIG. 13 illustrates a logical flow diagram generally showing yet another embodiment of a process for employing a browser to obtain a key from a generic cryptography API based on a media element.

Proceeding to block 1008, using the media element, the browser may be employed to obtain the second key from the GCAPI backend. Multiple embodiments for obtaining the second key from the GCAPI backend are described in more detail below in conjunction with FIGS. 11-13. Briefly, however, in one embodiment, the browser may be explicitly instructed to use a key provided to the GCAPI (FIG. 11). In another embodiment, the GCAPI may be instructed that a key is for use by the browser in conjunction with a particular media element (FIG. 12). In yet another embodiment, the browser can check the GCAPI for suitable keys (FIG. 13). In some embodiments, a combination of these methods for obtaining a key from the GCAPI may be employed. For example, in another embodiment, based on a particular media element, the browser can check the GCAPI for a suitable key (i.e., provide a key ID to the GCAPI to obtain a corresponding key) and the GCAPI may provide the suitable key if the GCAPI is instructed that the suitable key is for use by the browser for that particular media element.

In some other embodiments, the GCAPI may work together with an encrypted media extension API to further enable key exchange with the browser. In at least one such embodiment, a key handle (or the key) from the GCAPI may be provided to the browser via the encrypted media extensions (e.g., through an addKey( ) function). The media element may obtain the key from the GCAPI implementation or use the GCAPI implementation for decryption (e.g., at block 1010).

In any event, process 1000 continues at block 1010, where, using the media element, the browser may be employed to decrypt the encrypted content using the second key. In at least one embodiment, block 1010 may employ embodiments of block 912 of FIG. 9 to decrypt the encrypted content.

Process 1000 proceeds to block 1012, where the decrypted content may be displayed. In at least one embodiment, block 1012 may employ embodiments of block 514 of FIG. 5 to display the decrypted content.

After block 1012, process 1000 may return to a calling process to perform other actions.

FIG. 11 illustrates a logical flow diagram generally showing an embodiment of a process for employing a browser to obtain a key from a generic cryptography API. In some embodiments, process 1100 of FIG. 11 may be implemented by and/or executed on one or more network devices, such as client device 200B of FIG. 2B.

Process 1100 begins, after a start block, at block 1102, where, using and/or otherwise based on the media element, the browser may be instructed to use a current key stored by the GCAPI. In at least one embodiment, the application and/or the GCAPI may notify the browser that a key stored by the GCAPI is the key to use to decrypt encrypted content. In at least one embodiment, the GCAPI may maintain and/or store one key at a time (e.g., the second key as determined at block 1004 of FIG. 10).

Process 1100 proceeds to block 1104, where the browser may request the key (i.e., the second key as described in FIG. 10) from the GCAPI using and/or otherwise based on the media element. In some embodiments, the browser may provide the key ID to the GCAPI. In other embodiments, the browser may not provide a key ID and may request whatever key the GCAPI is maintaining.

Process 1100 proceeds next to decision block 1105, where a determination may be made whether the key is found by the GCAPI. If a key is found, then process 1100 may flow to block 1106; otherwise, an error may be returned and process 1100 may return to a calling process to perform other actions.

At block 1106, the GCAPI may provide the key (i.e., the second key) to the browser using and/or otherwise based on the media element. In some embodiments, the GCAPI may provide the key itself. In other embodiments, the GCAPI may provide a reference to the key, such as a handle to the key. In at least one embodiment, the GCAPI and the browser may be configured to communicate with each other.

After block 1106, process 1100 may return to a calling process to perform other actions, such as employing the browser using the media element to decrypt encrypted content using the key.

FIG. 12 illustrates a logical flow diagram generally showing another embodiment of a process for employing a browser to obtain a key from a generic cryptography API based on a media element. In some embodiments, process 1200 of FIG. 12 may be implemented by and/or executed on one or more network devices, such as client device 200B of FIG. 2B.

Process 1200 begins, after a start block, at block 1202, where the GCAPI may be instructed (e.g., by the application) that the key (i.e., the second key as described in FIG. 10) is associated with a particular media element. In at least one embodiment, the key may be associated with one or more media elements. In some embodiments, each key may include a tag or other identifier that indicates which media elements are associated with that particular key. In other embodiments, the GCAPI may maintain the associations between the keys and the media elements.

Process 1200 proceeds to block 1204, where the browser may request a key from the GCAPI using the media element. In some embodiments, the browser may not request the particular key, such as by a key ID, but rather, the browser may generically request a key maintained by the GCAPI for a particular media element.

Process 1200 continues to decision block 1206, where a determination may be made whether the GCAPI is maintaining a key that is associated with the media element. In some embodiments, the GCAPI may maintain a table or other data structure that identifies the keys and the associated media elements. In other embodiments, the GCAPI may analyze tags or other identifier of the keys to determine if the media element is associated with a key. If there is a key associated with the media element, then process 1200 may flow to block 1208; otherwise, process 1200 may return to a calling process to perform other actions.

At block 1208, the GCAPI may provide the associated key to the browser using the media element. In at least one embodiment, block 1208 may employ embodiments of block 1106 of FIG. 11 to provide the key to the browser.

After block 1208, process 1200 may return to a calling process to perform other actions.

FIG. 13 illustrates a logical flow diagram generally showing yet another embodiment of a process for employing a browser to obtain a key from a generic cryptography API based on a media element. In some embodiments, process 1300 of FIG. 13 may be implemented by and/or executed on one or more network devices, such as client device 200B of FIG. 2B.

Process 1300 begins, after a start block, at block 1302, where, using the media element, the browser may be provided with a key ID. In some embodiments, the browser may obtain the key ID from the encrypted content. In one embodiment, metadata associated with the encrypted content may include the key ID. In other embodiments, the application may provide the key ID to the browser using the media element.

Process 1300 proceeds to block 1304, where the browser may request the key from the GCAPI based on the key ID.

Process 1300 continues at decision block 1306, where a determination may be made whether a key associated with the key ID is found. In some embodiments, the GCAPI may maintain a list of all available keys and their corresponding key ID. A key may be found if the key ID provided by the media element is in the GCAPI list of keys. If the key is found, then process 1300 may flow to block 1308; otherwise, process 1300 may return to a calling process to perform other actions.

At block 1308, the GCAPI may provide the key to the browser using the media element. In at least one embodiment, block 1308 may employ embodiments of block 1106 of FIG. 11 to provide the key to the browser.

After block 1308, process 1300 may return to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

The above specification, examples, and data provide a complete description of the composition, manufacture, and use of the invention. Since many embodiments of the invention can be made without departing from the spirit and scope of the invention, the invention resides in the claims hereinafter appended.

What is claimed is:

1. A method for managing content, the method comprising:
    providing, using a hardware processor, a key to a web-based application that operates on a browser application;
    performing an action on the key using a generic cryptography application program interface (GCAPI) that is associated with the browser application;
    providing encrypted content to the web-based application;
    providing an indication of the key to a second application program interface associated with a media element supported by the web-based application, wherein the media element is a component of a markup language for displaying a web page in the browser application;
    decrypting the encrypted content using the second application program interface associated with the media element supported by the web-based application and based on the key; and
    causing the decrypted content to be presented by the web-based application by providing a reference to the decrypted content to the media element.

2. The method of claim 1, wherein the key is an encrypted key and wherein the action performed on the key using the GCAPI is decrypting the encrypted key based on a platform key that corresponds to a device executing the browser application.

3. The method of claim 2, further comprising:
    determining whether the key is associated with one or more encryption types supported by the browser application; and
    in response to determining that the key is not associated with the one or more encryption types supported by the browser application, generating a second key based on the key that is associated with the one or more encryption types supported by the browser application.

4. The method of claim 1, wherein encrypted content is provided based on the media element of the markup language that is supported by the browser application.

5. The method of claim 1, further comprising providing a portion of the encrypted content to the GCAPI to decrypt the encrypted content, wherein the portion of the encrypted content has been determined based on one or more properties of the encrypted content.

6. The method of claim 1, wherein the action performed on the key further comprises:
    generating a second key based on the key;
    associating the second key with the media element;
    obtaining a current key stored by the GCAPI, wherein the current key is the second key; and in response to a key request based on the media element, using the GCAPI to transmit the second key to the browser application.

7. The method of claim 1, further comprising:
determining that a key identifier is associated with the encrypted content;
obtaining, using the GCAPI, a second key from a key store based on the key identifier; and
decrypting the encrypted content based on the media element supported by the web-based application and based on the second key.

8. The method of claim 1, further comprising:
causing the GCAPI to provide the reference to the decrypted content to the media element.

9. A system for managing content, the system comprising:
a hardware processor that is configured to:
provide a key to a web-based application that operates on a browser application;
perform an action on the key using a generic cryptography application program interface (GCAPI) that is associated with the browser application;
provide encrypted content to the web-based application;
provide an indication of the key to a second application program interface associated with a media element supported by the web-based application, wherein the media element is a component of a markup language for displaying a web page in the browser application;
decrypt the encrypted content using the second application program interface associated with the media element supported by the web-based application and based on the key; and
cause the decrypted content to be presented by the web-based application by providing a reference to the decrypted content to the media element.

10. The system of claim 9, wherein the key is an encrypted key and wherein the action performed on the key using the GCAPI is decrypting the encrypted key based on a platform key that corresponds to a device executing the browser application.

11. The system of claim 10, wherein the hardware processor is further configured to:

determining whether the key is associated with one or more encryption types supported by the browser application; and
in response to determining that the key is not associated with the one or more encryption types supported by the browser application, generating a second key based on the key that is associated with the one or more encryption types supported by the browser application.

12. The system of claim 9, wherein encrypted content is provided based on the media element of the markup language that is supported by the browser application.

13. The system of claim 9, wherein the hardware processor is further configured to provide a portion of the encrypted content to the GCAPI to decrypt the encrypted content, wherein the portion of the encrypted content has been determined based on one or more properties of the encrypted content.

14. The system of claim 9, wherein the hardware processor is further configured to:
generate a second key based on the key;
associate the second key with the media element;
obtain a current key stored by the GCAPI, wherein the current key is the second key; and
in response to a key request based on the media element, use the GCAPI to transmit the second key to the browser application.

15. The system of claim 9, wherein the hardware processor is further configured to:
determine that a key identifier is associated with the encrypted content;
obtain, using the GCAPI, a second key from a key store based on the key identifier; and
decrypt the encrypted content based on the media element supported by the web-based application and based on the second key.

16. The system of claim 9, wherein the hardware processor is further configured to:
cause the GCAPI to provide the reference to the decrypted content to the media element.

* * * * *